(12) United States Patent
Wlassich et al.

(10) Patent No.: US 11,503,782 B2
(45) Date of Patent: Nov. 22, 2022

(54) SMART DRIP IRRIGATION EMITTER

(71) Applicant: Rain Bird Corporation, Azusa, CA (US)

(72) Inventors: John James Wlassich, Pasadena, CA (US); Janet Marie Reilly, La Verne, CA (US)

(73) Assignee: Rain Bird Corporation, Azusa, CA (US)

( * ) Notice: Subject to any disclaimer, the term of this patent is extended or adjusted under 35 U.S.C. 154(b) by 867 days.

(21) Appl. No.: 16/375,366

(22) Filed: Apr. 4, 2019

(65) Prior Publication Data

US 2019/0313590 A1    Oct. 17, 2019

Related U.S. Application Data

(60) Provisional application No. 62/655,890, filed on Apr. 11, 2018.

(51) Int. Cl.
*A01G 27/00*  (2006.01)
*A01G 25/16*  (2006.01)
*A01G 13/02*  (2006.01)
*A01G 9/02*   (2018.01)

(52) U.S. Cl.
CPC ......... *A01G 27/003* (2013.01); *A01G 25/167* (2013.01); *A01G 9/02* (2013.01); *A01G 13/02* (2013.01)

(58) Field of Classification Search
CPC ...... A01G 27/003; A01G 25/167; A01G 9/02; A01G 13/02; A01G 27/00; A01G 25/162; A01G 25/165
See application file for complete search history.

(56) References Cited

U.S. PATENT DOCUMENTS

| 211,820 A | 1/1879 | White |
| 306,972 A | 10/1884 | Stiles |
| 674,917 A | 5/1901 | Halbert |
| 766,420 A | 8/1904 | Calley |

(Continued)

FOREIGN PATENT DOCUMENTS

| CN | 85205374 U | 11/1986 |
| CN | 1345531 | 4/2002 |

(Continued)

OTHER PUBLICATIONS

USPTO; U.S. Appl. No. 16/007,007; Notice of Allowance dated Oct. 28, 2020; (pp. 1-7).

(Continued)

*Primary Examiner* — Monica L Perry
*Assistant Examiner* — Aaron M Rodziwicz
(74) *Attorney, Agent, or Firm* — Fitch, Even, Tabin & Flannery, LLP

(57) ABSTRACT

There is provided a smart drip irrigation emitter to provide intelligent features including on-demand watering, sensors and communication links. The emitters can be activated by a wireless signal to power and/or control water delivery from the emitter. The emitter also may include sensors that gather data pertaining to an individual plant. Based on the data received by the sensors, the emitter intelligently determines whether to water the plant. The smart emitter can form a communication network with other smart emitters.

15 Claims, 12 Drawing Sheets

(56) References Cited

U.S. PATENT DOCUMENTS

| | | |
|---|---|---|
| 1,001,593 A | 8/1911 | Harry |
| 1,566,375 A | 12/1925 | Coatalen |
| 1,764,712 A | 6/1930 | Brackett |
| 2,259,990 A | 10/1941 | Baumann |
| 2,342,347 A | 2/1944 | Jacobsen |
| 2,477,587 A | 8/1949 | Doutt |
| 2,504,057 A | 4/1950 | Trefil |
| 2,638,109 A | 5/1953 | Wahlmark |
| 2,746,471 A | 5/1956 | Cobb |
| 2,860,015 A | 11/1958 | Matterson |
| 2,940,474 A | 6/1960 | Webster |
| 2,953,248 A | 9/1960 | Troland |
| 3,082,359 A | 3/1963 | Seybold |
| 3,203,447 A | 8/1965 | Bremner |
| 3,262,027 A | 7/1966 | Churchill |
| 3,279,749 A | 10/1966 | Fleckenstein |
| 3,339,583 A | 9/1967 | Fleckenstein |
| 3,379,214 A | 4/1968 | Weinberg |
| 3,411,745 A | 11/1968 | Austin, Jr. |
| 3,420,492 A | 1/1969 | Ray |
| 3,448,960 A | 6/1969 | Medley |
| 3,458,769 A | 7/1969 | Stampfli |
| 3,477,693 A | 11/1969 | Bezanis |
| 3,481,578 A | 12/1969 | Baldi |
| 3,504,315 A | 3/1970 | Stanwell |
| 3,511,472 A | 5/1970 | Zimmerman |
| 3,547,154 A | 12/1970 | Benham |
| 3,598,145 A | 8/1971 | Wolfson |
| 3,598,360 A | 8/1971 | Merriner |
| 3,633,869 A | 1/1972 | Lehmann |
| 3,729,710 A | 4/1973 | Sherwin |
| 3,743,898 A | 7/1973 | Sturman |
| 3,747,620 A | 7/1973 | Kah, Jr. |
| 3,757,263 A | 9/1973 | Merriner |
| 3,941,348 A | 3/1976 | Mott |
| 3,977,436 A | 8/1976 | Larner |
| 3,989,066 A | 11/1976 | Sturman |
| 4,004,258 A | 1/1977 | Arnold |
| 4,007,458 A | 2/1977 | Hollabaugh |
| 4,010,390 A | 3/1977 | Stampfli |
| 4,022,244 A | 5/1977 | Oman |
| 4,029,295 A | 6/1977 | Wassmer |
| D246,377 S | 11/1977 | Pansini |
| 4,056,255 A | 11/1977 | Lace |
| 4,065,722 A | 12/1977 | Francis |
| 4,074,699 A | 2/1978 | Stampfli |
| 4,082,116 A | 4/1978 | Stampfli |
| 4,099,701 A | 7/1978 | Berger |
| 4,111,230 A | 9/1978 | Stampfli |
| 4,114,184 A | 9/1978 | Stampfli |
| 4,121,114 A | 10/1978 | Ruggles |
| 4,131,882 A | 12/1978 | Hollabaugh |
| 4,165,532 A | 8/1979 | Kendall |
| 4,176,395 A | 11/1979 | Evelyn-Veere |
| 4,241,375 A | 12/1980 | Ruggles |
| 4,251,053 A | 2/1981 | Wurzer |
| 4,257,573 A | 3/1981 | Stampfli |
| D266,863 S | 11/1982 | Mason |
| 4,383,234 A | 5/1983 | Yatsushiro |
| 4,419,643 A | 12/1983 | Ojima |
| 4,423,484 A | 12/1983 | Hamilton |
| 4,445,788 A | 5/1984 | Twersky |
| 4,470,030 A | 9/1984 | Myers |
| 4,506,701 A | 3/1985 | Masaki |
| 4,535,401 A | 8/1985 | Penn |
| 4,537,387 A | 8/1985 | Danby |
| 4,540,154 A | 9/1985 | Kolchinsky |
| 4,548,225 A | 10/1985 | Busalacchi |
| 4,556,864 A | 12/1985 | Roy |
| 4,562,506 A | 12/1985 | Moran |
| 4,590,962 A | 5/1986 | Tespa |
| 4,596,266 A | 6/1986 | Kinghorn |
| 4,637,548 A | 1/1987 | Ray |
| 4,643,393 A | 2/1987 | Kosugi |
| 4,645,882 A | 2/1987 | Nakayama |
| 4,662,399 A | 5/1987 | Buchner |
| 4,679,767 A | 7/1987 | Vollmer |
| 4,697,786 A | 10/1987 | Kennedy |
| 4,716,490 A | 12/1987 | Alexanian |
| 4,718,454 A | 1/1988 | Appleby |
| 4,720,078 A | 1/1988 | Nakamura |
| D294,964 S | 3/1988 | Mendenhall |
| 4,733,212 A | 3/1988 | Goodwin |
| 4,751,487 A | 6/1988 | Green, Jr. |
| 4,758,811 A | 7/1988 | Slavin |
| D297,929 S | 10/1988 | Hughes |
| 4,777,556 A | 10/1988 | Imran |
| 4,781,213 A | 11/1988 | Kilayko |
| 4,790,351 A | 12/1988 | Kervagoret |
| 4,794,890 A | 1/1989 | Richeson, Jr. |
| 4,801,910 A | 1/1989 | Ayers |
| 4,811,221 A | 3/1989 | Sturman |
| 4,829,947 A | 5/1989 | Lequesne |
| 4,852,802 A | 8/1989 | Iggulden |
| 4,893,645 A | 1/1990 | Augustinas |
| 4,954,799 A | 9/1990 | Kumar |
| 4,967,996 A | 11/1990 | Sonoda |
| 4,994,776 A | 2/1991 | Juncu |
| 5,008,664 A | 4/1991 | More |
| 5,010,911 A | 4/1991 | Grant |
| 5,021,939 A | 6/1991 | Pulgiese |
| 5,023,787 A | 6/1991 | Evelyn-Veere |
| 5,048,755 A | 9/1991 | Dodds |
| 5,050,800 A | 9/1991 | Lamar |
| 5,064,166 A | 11/1991 | Schechter |
| 5,067,688 A | 11/1991 | Tanimoto |
| 5,071,267 A | 12/1991 | Aldefeld |
| 5,079,667 A | 1/1992 | Kasano |
| 5,085,402 A | 2/1992 | O'Dell |
| 5,097,861 A | 3/1992 | Hopkins |
| 5,100,056 A | 3/1992 | Theodorsen |
| 5,125,432 A | 6/1992 | Fujii |
| 5,139,226 A | 8/1992 | Baldwin |
| 5,145,148 A | 9/1992 | Laurent |
| 5,153,550 A | 10/1992 | Sugiura |
| 5,186,433 A | 2/1993 | Pausch |
| 5,199,462 A | 4/1993 | Baker |
| 5,213,303 A | 5/1993 | Walker |
| 5,229,649 A | 7/1993 | Nielsen |
| 5,229,937 A | 7/1993 | Evelyn-Veere |
| 5,251,153 A | 10/1993 | Nielsen |
| 5,311,162 A | 5/1994 | Sjoquist |
| 5,333,785 A | 8/1994 | Dodds |
| 5,347,421 A | 9/1994 | Alexanian |
| 5,365,210 A | 11/1994 | Hines |
| 5,375,811 A | 12/1994 | Reinicke |
| 5,402,303 A | 3/1995 | Luck |
| D361,057 S | 8/1995 | Fayfield |
| 5,441,233 A | 8/1995 | Asou |
| 5,479,339 A | 12/1995 | Miller |
| 5,482,080 A | 1/1996 | Bergmann |
| 5,485,400 A | 1/1996 | Warrior |
| 5,497,135 A | 3/1996 | Wisskirchen |
| 5,546,063 A | 8/1996 | Hoffman |
| 5,566,921 A | 10/1996 | Yokota |
| 5,584,465 A | 12/1996 | Ochsenreiter |
| 5,621,669 A | 4/1997 | Bjornsson |
| 5,622,351 A | 4/1997 | Kim |
| 5,638,847 A | 6/1997 | Hoch |
| 5,645,264 A | 7/1997 | Kah |
| 5,649,818 A | 7/1997 | Day |
| 5,655,561 A | 8/1997 | Wendel |
| 5,655,747 A | 8/1997 | Pasut |
| 5,661,349 A | 8/1997 | Luck |
| 5,687,759 A | 11/1997 | Tan |
| 5,696,671 A | 12/1997 | Oliver |
| 5,714,931 A | 2/1998 | Petite |
| 5,730,423 A | 3/1998 | Wu |
| 5,740,031 A | 4/1998 | Gagnon |
| 5,760,706 A | 6/1998 | Kiss |
| 5,780,938 A | 7/1998 | Edwards |
| 5,785,298 A | 7/1998 | Kumar |
| 5,813,606 A | 9/1998 | Ziff |
| 5,825,664 A | 10/1998 | Warrior |

(56) References Cited

U.S. PATENT DOCUMENTS

| | | |
|---|---|---|
| 5,826,619 A | 10/1998 | Roman |
| 5,839,658 A | 11/1998 | Sarver |
| 5,848,609 A | 12/1998 | Marchesseault |
| 5,848,780 A | 12/1998 | Miller |
| 5,851,004 A | 12/1998 | Wu |
| 5,871,156 A | 2/1999 | Lawson |
| 5,895,026 A | 4/1999 | Linkner, Jr. |
| 5,914,847 A | 6/1999 | Alexanian |
| 5,915,665 A | 6/1999 | Paese |
| 5,926,531 A | 7/1999 | Petite |
| 5,927,607 A | 7/1999 | Scott |
| 5,938,172 A | 8/1999 | Ohtsuka |
| D413,650 S | 9/1999 | Sato |
| 5,961,045 A | 10/1999 | Doldren |
| 5,967,424 A | 10/1999 | Bonnah, II |
| 5,971,025 A | 10/1999 | Backlund |
| 5,979,482 A | 11/1999 | Scott |
| 5,996,608 A | 12/1999 | Hunter |
| 6,012,700 A | 1/2000 | Johnson |
| 6,021,038 A | 2/2000 | Hanchett |
| 6,028,522 A | 2/2000 | Petite |
| 6,040,752 A | 3/2000 | Fisher |
| 6,047,907 A | 4/2000 | Hornby |
| 6,047,947 A | 4/2000 | Kumar |
| 6,061,603 A | 5/2000 | Papadopoulos |
| 6,073,904 A | 6/2000 | Diller |
| 6,076,550 A | 6/2000 | Hiraishi |
| 6,076,801 A | 6/2000 | Duhack |
| 6,076,803 A | 6/2000 | Johnson |
| 6,079,433 A | 6/2000 | Saarem |
| 6,086,042 A | 7/2000 | Scott |
| 6,088,621 A | 7/2000 | Woytowitz |
| D430,268 S | 8/2000 | Hiramatsu |
| 6,095,496 A | 8/2000 | Rydin |
| 6,098,898 A | 8/2000 | Storch |
| 6,124,775 A | 9/2000 | Linkner, Jr. |
| 6,126,141 A | 10/2000 | Geiger |
| 6,154,354 A | 11/2000 | Alexanian |
| 6,163,239 A | 12/2000 | Ozawa |
| 6,164,331 A | 12/2000 | Sugita |
| 6,179,268 B1 | 1/2001 | Seid |
| 6,186,413 B1 | 2/2001 | Lawson |
| 6,199,587 B1 | 3/2001 | Shiomi |
| 6,218,921 B1 | 4/2001 | Eberts |
| 6,218,953 B1 | 4/2001 | Petite |
| 6,219,903 B1 | 4/2001 | Osterhart |
| 6,220,275 B1 | 4/2001 | Nishinosono |
| 6,220,299 B1 | 4/2001 | Arvidsson |
| D443,030 S | 5/2001 | Kaneko |
| 6,224,033 B1 | 5/2001 | Kumar |
| 6,227,455 B1 | 5/2001 | Scott |
| 6,233,327 B1 | 5/2001 | Petite |
| 6,236,293 B1 | 5/2001 | Forster |
| 6,244,298 B1 | 6/2001 | Sugita |
| 6,263,901 B1 | 7/2001 | Lohde |
| 6,283,139 B1 | 9/2001 | Symonds |
| 6,293,516 B1 | 9/2001 | Parsons |
| 6,305,662 B1 | 10/2001 | Parsons |
| 6,313,852 B1 | 11/2001 | Ishizaki |
| 6,314,340 B1 | 11/2001 | Mecham |
| 6,335,855 B1 | 1/2002 | Alexanian |
| 6,336,621 B1 | 1/2002 | Ii |
| 6,337,635 B1 | 1/2002 | Ericksen |
| 6,341,759 B1 | 1/2002 | Noller |
| 6,351,366 B1 | 2/2002 | Alexanian |
| 6,366,189 B1 | 4/2002 | Bergvall |
| 6,374,814 B1 | 4/2002 | Cook |
| 6,378,838 B1 | 4/2002 | Brundisini |
| 6,382,532 B1 | 5/2002 | French |
| 6,386,221 B1 | 5/2002 | Knoll |
| 6,386,505 B2 | 5/2002 | Schoeb |
| 6,394,126 B2 | 5/2002 | Lohde |
| 6,394,413 B2 | 5/2002 | Lohde |
| D459,441 S | 6/2002 | Hayashi |
| 6,402,057 B1 | 6/2002 | Kimmel |
| 6,405,752 B1 | 6/2002 | Fritsch |
| 6,409,144 B1 | 6/2002 | Inami |
| D460,148 S | 7/2002 | Hayashi |
| 6,422,488 B1 | 7/2002 | Fochtman |
| 6,424,243 B1 | 7/2002 | Forster |
| 6,430,268 B1 | 8/2002 | Petite |
| 6,437,692 B1 | 8/2002 | Petite |
| 6,446,885 B1 | 9/2002 | Sims, Jr. |
| 6,450,478 B2 | 9/2002 | Parsons |
| 6,452,499 B1 | 9/2002 | Runge |
| 6,460,563 B2 | 10/2002 | Olson |
| 6,480,497 B1 | 11/2002 | Flammer, III |
| 6,481,646 B1 | 11/2002 | Hornby |
| 6,491,235 B1 | 12/2002 | Scott |
| 6,492,751 B1 | 12/2002 | Ineson |
| 6,498,558 B1 | 12/2002 | Linkner, Jr. |
| 6,499,677 B2 | 12/2002 | Dallmeyer |
| 6,501,359 B2 | 12/2002 | Matsusaka |
| 6,502,770 B2 | 1/2003 | Dallmeyer |
| 6,508,272 B1 | 1/2003 | Parsons |
| D470,823 S | 2/2003 | Ufer |
| 6,529,589 B1 | 3/2003 | Nelson |
| 6,536,681 B2 | 3/2003 | Dallmeyer |
| 6,542,059 B2 | 4/2003 | Sato |
| 6,543,744 B2 | 4/2003 | Carrillo |
| 6,546,945 B2 | 4/2003 | Ishigaki |
| 6,550,690 B2 | 4/2003 | Dallmeyer |
| 6,553,336 B1 | 4/2003 | Johnson |
| 6,557,580 B2 | 5/2003 | Lohde |
| 6,568,080 B2 | 5/2003 | Kimmel |
| 6,568,609 B2 | 5/2003 | Dallmeyer |
| D477,287 S | 7/2003 | Roman |
| 6,598,852 B2 | 7/2003 | Tomoda |
| 6,600,971 B1 | 7/2003 | Smith |
| 6,601,300 B2 | 8/2003 | Hasegawa |
| 6,604,726 B2 | 8/2003 | Kumar |
| 6,609,698 B1 | 8/2003 | Parsons |
| 6,616,120 B2 | 9/2003 | Barzuza |
| 6,616,249 B2 | 9/2003 | Han |
| 6,618,578 B1 | 9/2003 | Petite |
| 6,619,320 B2 | 9/2003 | Parsons |
| 6,619,614 B2 | 9/2003 | Parsons |
| 6,627,077 B2 | 9/2003 | Fritsch |
| 6,628,764 B1 | 9/2003 | Petite |
| 6,651,628 B2 | 11/2003 | Nally |
| 6,652,188 B1 | 11/2003 | Albright |
| 6,655,609 B2 | 12/2003 | Dallmeyer |
| 6,671,586 B2 | 12/2003 | Davis |
| 6,676,044 B2 | 1/2004 | Dallmeyer |
| 6,685,112 B1 | 2/2004 | Hornby |
| 6,685,158 B2 | 2/2004 | Parsons |
| 6,687,997 B2 | 2/2004 | Dallmeyer |
| 6,691,740 B2 | 2/2004 | Yoshida |
| 6,691,979 B2 | 2/2004 | Parsons |
| 6,694,223 B1 | 2/2004 | Goldberg |
| 6,695,281 B2 | 2/2004 | Williams |
| 6,707,174 B2 | 3/2004 | Lin |
| 6,708,084 B2 | 3/2004 | Battistutto |
| 6,715,732 B2 | 4/2004 | Kumar |
| 6,720,853 B1 | 4/2004 | Callis |
| 6,721,630 B1 | 4/2004 | Woytowitz |
| 6,722,628 B1 | 4/2004 | Seil |
| 6,745,457 B2 | 6/2004 | Noller |
| 6,747,557 B1 | 6/2004 | Petite |
| 6,748,976 B2 | 6/2004 | Sato |
| 6,749,136 B1 | 6/2004 | Wilson |
| 6,749,175 B2 | 6/2004 | Sato |
| 6,752,371 B2 | 6/2004 | Herbert |
| 6,756,871 B1 | 6/2004 | Suzuki |
| 6,763,287 B2 | 7/2004 | Brundisini |
| 6,766,221 B1 | 7/2004 | Christiansen |
| 6,766,825 B2 | 7/2004 | Antunez |
| 6,769,176 B2 | 8/2004 | Hornby |
| 6,778,099 B1 | 8/2004 | Meyer |
| 6,782,310 B2 | 8/2004 | Bailey |
| 6,782,311 B2 | 8/2004 | Barlow |
| 6,783,287 B2 | 8/2004 | Kudo |
| 6,784,807 B2 | 8/2004 | Petite |
| 6,791,442 B1 | 9/2004 | Schmidt |

(56) References Cited

U.S. PATENT DOCUMENTS

| | | |
|---|---|---|
| 6,792,323 B2 | 9/2004 | Krzyzanowski |
| 6,793,162 B2 | 9/2004 | Dallmeyer |
| 6,812,826 B2 | 11/2004 | Buhler |
| 6,823,239 B2 | 11/2004 | Sieminski |
| 6,830,232 B2 | 12/2004 | Burrola |
| 6,836,737 B2 | 12/2004 | Petite |
| 6,840,460 B2 | 1/2005 | Clark |
| 6,842,667 B2 | 1/2005 | Beutler |
| 6,848,632 B2 | 2/2005 | Clark |
| 6,851,622 B2 | 2/2005 | Demere |
| 6,851,631 B2 | 2/2005 | Dallmeyer |
| 6,853,883 B2 | 2/2005 | Kreikemeier |
| 6,854,706 B2 | 2/2005 | Sato |
| 6,862,498 B2 | 3/2005 | Davis |
| 6,874,535 B2 | 4/2005 | Parsons |
| 6,874,707 B2 | 4/2005 | Skinner |
| 6,877,526 B2 | 4/2005 | Burrola |
| 6,877,714 B2 | 4/2005 | Hall |
| 6,877,717 B2 | 4/2005 | Collins |
| 6,891,838 B1 | 5/2005 | Petite |
| 6,892,114 B1 | 5/2005 | Addink |
| 6,895,987 B2 | 5/2005 | Addink |
| 6,898,467 B1 | 5/2005 | Smith |
| 6,903,647 B2 | 6/2005 | Linkner, Jr. |
| 6,904,668 B2 | 6/2005 | Dallmeyer |
| 6,914,533 B2 | 7/2005 | Petite |
| 6,914,893 B2 | 7/2005 | Petite |
| 6,932,316 B2 | 8/2005 | Herbert |
| 6,932,320 B2 | 8/2005 | Fukano |
| 6,938,834 B2 | 9/2005 | Harris |
| 6,944,523 B2 | 9/2005 | Addink |
| 6,947,810 B2 | 9/2005 | Skinner |
| 6,947,854 B2 | 9/2005 | Swarztrauber |
| 6,948,697 B2 | 9/2005 | Herbert |
| 6,950,728 B1 | 9/2005 | Addink |
| 6,955,334 B2 | 10/2005 | Parsons |
| 6,955,337 B2 | 10/2005 | Weber |
| 6,959,904 B2 | 11/2005 | Beraldo |
| 6,963,808 B1 | 11/2005 | Addink |
| 6,971,684 B2 | 12/2005 | Ferrari |
| 6,978,794 B2 | 12/2005 | Dukes |
| 6,985,060 B2 | 1/2006 | Parker |
| 6,991,214 B2 | 1/2006 | Richter |
| 6,993,416 B2 | 1/2006 | Christiansen |
| 6,997,642 B2 | 2/2006 | Bishop |
| 7,000,890 B2 | 2/2006 | Bell |
| 7,003,357 B1 | 2/2006 | Kreikemeier |
| 7,004,450 B2 | 2/2006 | Yoshimura |
| 7,010,395 B1 | 3/2006 | Goldberg |
| 7,010,396 B2 | 3/2006 | Ware |
| 7,012,394 B2 | 3/2006 | Moore |
| 7,012,546 B1 | 3/2006 | Zigdon |
| 7,017,605 B2 | 3/2006 | Stroud |
| 7,019,667 B2 | 3/2006 | Petite |
| 7,021,750 B2 | 4/2006 | Shibata |
| 7,024,256 B2 | 4/2006 | Krzyzanowski |
| 7,050,887 B2 | 5/2006 | Alvarez |
| 7,053,767 B2 | 5/2006 | Petite |
| 7,058,478 B2 | 6/2006 | Alexanian |
| 7,058,479 B2 | 6/2006 | Miller |
| 7,059,548 B2 | 6/2006 | Reiter |
| 7,063,270 B2 | 6/2006 | Bowers |
| 7,069,115 B1 | 6/2006 | Woytowitz |
| D524,910 S | 7/2006 | Matsumoto |
| 7,069,941 B2 | 7/2006 | Parsons |
| 7,079,810 B2 | 7/2006 | Petite |
| D527,073 S | 8/2006 | Yajima |
| 7,084,741 B2 | 8/2006 | Plummer |
| 7,086,383 B2 | 8/2006 | Ivens |
| 7,093,362 B2 | 8/2006 | Dallmeyer |
| 7,103,511 B2 | 9/2006 | Petite |
| 7,106,158 B2 | 9/2006 | Forsythe |
| 7,123,993 B1 | 10/2006 | Freeman |
| 7,133,749 B2 | 11/2006 | Goldberg |
| 7,137,550 B1 | 11/2006 | Petite |
| 7,146,225 B2 | 12/2006 | Guenst |
| 7,146,254 B1 | 12/2006 | Howard |
| 7,146,255 B2 | 12/2006 | Christiansen |
| 7,156,363 B2 | 1/2007 | Parsons |
| 7,168,638 B2 | 1/2007 | Saito |
| 7,172,366 B1 | 2/2007 | Bishop |
| 7,181,319 B2 | 2/2007 | Woytowtiz |
| 7,182,272 B1 | 2/2007 | Marian |
| 7,182,311 B2 | 2/2007 | Kimble |
| 7,184,848 B2 | 2/2007 | Krzyzanowski |
| 7,184,861 B2 | 2/2007 | Petite |
| 7,187,262 B1 | 3/2007 | Henry |
| 7,187,285 B2 | 3/2007 | Staples |
| 7,188,822 B2 | 3/2007 | Marcichow |
| 7,196,602 B2 | 3/2007 | Adams |
| 7,203,576 B1 | 4/2007 | Wilson |
| 7,206,669 B2 | 4/2007 | Christiansen |
| 7,209,840 B2 | 4/2007 | Petite |
| D541,905 S | 5/2007 | Yajima |
| D542,682 S | 5/2007 | Waki |
| 7,225,057 B2 | 5/2007 | Froman |
| 7,227,439 B2 | 6/2007 | Kelly |
| 7,240,740 B2 | 7/2007 | Reilly |
| 7,245,991 B1 | 7/2007 | Woytowitz |
| 7,246,787 B2 | 7/2007 | Kumar |
| 7,248,945 B2 | 7/2007 | Woytowitz |
| 7,249,749 B2 | 7/2007 | Niwa |
| 7,250,860 B2 | 7/2007 | Smith |
| D549,077 S | 8/2007 | Yajima |
| D549,241 S | 8/2007 | Giddens |
| 7,257,465 B2 | 8/2007 | Perez |
| 7,263,073 B2 | 8/2007 | Petite |
| 7,266,428 B2 | 9/2007 | Alexanian |
| 7,270,093 B2 | 9/2007 | Luercho |
| 7,273,206 B2 | 9/2007 | Sato |
| 7,280,019 B2 | 10/2007 | Kolb |
| 7,286,904 B2 | 10/2007 | Graham |
| 7,289,862 B2 | 10/2007 | Britton |
| 7,293,757 B2 | 11/2007 | Akabane |
| 7,295,128 B2 | 11/2007 | Petite |
| 7,303,147 B1 | 12/2007 | Danner |
| 7,305,280 B2 | 12/2007 | Marian |
| 7,309,033 B2 | 12/2007 | Dallmeyer |
| 7,317,972 B2 | 1/2008 | Addink |
| 7,325,564 B2 | 2/2008 | Ryuen |
| 7,325,781 B2 | 2/2008 | Parsons |
| 7,328,089 B2 | 2/2008 | Curren |
| 7,330,796 B2 | 2/2008 | Addink |
| D563,507 S | 3/2008 | Kato |
| 7,339,957 B2 | 3/2008 | Hitt |
| 7,346,463 B2 | 3/2008 | Petite |
| 7,347,383 B2 | 3/2008 | Dallmeyer |
| 7,358,626 B2 | 4/2008 | Gardner |
| 7,359,769 B2 | 4/2008 | Bailey |
| 7,378,768 B2 | 5/2008 | Ohkawa |
| 7,383,721 B2 | 6/2008 | Parsons |
| 7,383,851 B2 | 6/2008 | Jacobsen |
| 7,389,952 B2 | 6/2008 | Dallmeyer |
| 7,392,053 B1 | 6/2008 | Conner |
| 7,396,000 B2 | 7/2008 | Parsons |
| 7,397,907 B2 | 7/2008 | Petite |
| 7,398,139 B1 | 7/2008 | Woytowitz |
| 7,400,944 B2 | 7/2008 | Bailey |
| 7,403,840 B2 | 7/2008 | Moore |
| 7,406,363 B2 | 7/2008 | Doering |
| 7,412,245 B2 | 8/2008 | Guo |
| 7,412,303 B1 | 8/2008 | Porter |
| 7,412,317 B2 | 8/2008 | Takamatsu |
| 7,414,502 B2 | 8/2008 | Tackes |
| 7,421,317 B2 | 9/2008 | Christiansen |
| 7,422,160 B2 | 9/2008 | Dallmeyer |
| 7,423,985 B1 | 9/2008 | Hill |
| 7,424,527 B2 | 9/2008 | Petite |
| 7,429,006 B2 | 9/2008 | Dallmeyer |
| 7,437,778 B2 | 10/2008 | Parsons |
| 7,444,207 B2 | 10/2008 | Nickerson |
| D581,880 S | 12/2008 | Neitzel |
| 7,458,521 B2 | 12/2008 | Ivans |
| 7,468,661 B2 | 12/2008 | Petite |

(56) References Cited

U.S. PATENT DOCUMENTS

| | | |
|---|---|---|
| 7,472,883 B2 | 1/2009 | Murao |
| 7,474,024 B2 | 1/2009 | Nakanishi |
| 7,475,863 B2 | 1/2009 | Donovan |
| 7,480,501 B2 | 1/2009 | Petite |
| 7,487,798 B2 | 2/2009 | Furuta |
| 7,487,925 B2 | 2/2009 | Skinner |
| 7,503,346 B1 | 3/2009 | Clark |
| 7,503,347 B2 | 3/2009 | Ryuen |
| 7,520,449 B2 | 4/2009 | Matsuo |
| 7,526,365 B1 | 4/2009 | French |
| 7,530,506 B2 | 5/2009 | Kato |
| 7,532,100 B2 | 5/2009 | Henry |
| 7,546,181 B2 | 6/2009 | Vidovich |
| 7,556,537 B2 | 7/2009 | Schenk |
| 7,558,650 B2 | 7/2009 | Thornton |
| 7,562,399 B2 | 7/2009 | Parsons |
| 7,564,842 B2 | 7/2009 | Callaway, Jr. |
| 7,567,858 B1 | 7/2009 | Dunlap |
| 7,574,284 B2 | 8/2009 | Goldberg |
| 7,574,285 B2 | 8/2009 | Kah |
| 7,584,023 B1 | 9/2009 | Palmer |
| 7,590,471 B2 | 9/2009 | Jacobsen |
| 7,596,429 B2 | 9/2009 | Cardinal |
| D603,015 S | 10/2009 | Matsumura |
| 7,613,547 B1 | 11/2009 | Woytowitz |
| 7,619,322 B2 | 11/2009 | Gardner |
| 7,637,475 B2 | 12/2009 | Adams |
| 7,640,079 B2 | 12/2009 | Nickerson |
| 7,643,823 B2 | 1/2010 | Shamoon |
| 7,650,425 B2 | 1/2010 | Davis |
| 7,665,713 B1 | 2/2010 | Clark |
| 7,668,532 B2 | 2/2010 | Shamoon |
| 7,668,990 B2 | 2/2010 | Krzyzanowski |
| D611,001 S | 3/2010 | Ihde |
| 7,690,623 B2 | 4/2010 | Parsons |
| 7,694,934 B2 | 4/2010 | Irwin |
| 7,697,248 B2 | 4/2010 | Tomimbang |
| 7,697,492 B2 | 4/2010 | Petite |
| 7,701,314 B2 | 4/2010 | Hazzard |
| 7,703,707 B2 | 4/2010 | Yasukawa |
| 7,703,709 B2 | 4/2010 | Akabane |
| 7,707,125 B2 | 4/2010 | Haji-Valizadeh |
| D615,618 S | 5/2010 | Someya |
| 7,710,226 B2 | 5/2010 | Nelson |
| 7,711,454 B2 | 5/2010 | Addink |
| 7,711,796 B2 | 5/2010 | Gutt |
| 7,719,394 B2 | 5/2010 | Nelson |
| 7,719,432 B1 | 5/2010 | Hill |
| 7,726,630 B2 | 6/2010 | Cripps |
| 7,731,154 B2 | 6/2010 | Parsons |
| 7,735,513 B2 | 6/2010 | Bush |
| 7,738,999 B2 | 6/2010 | Petite |
| 7,739,378 B2 | 6/2010 | Petite |
| 7,756,086 B2 | 7/2010 | Petite |
| 7,762,523 B2 | 7/2010 | Smith |
| D622,226 S | 8/2010 | Crist |
| D622,709 S | 8/2010 | Hern |
| 7,772,726 B1 | 8/2010 | Porter |
| 7,792,612 B2 | 9/2010 | Kah |
| 7,806,382 B1 | 10/2010 | Palumbo |
| 7,826,931 B2 | 11/2010 | Lorenz |
| 7,830,231 B2 | 11/2010 | Carlino |
| 7,844,368 B2 | 11/2010 | Alexanian |
| 7,844,369 B2 | 11/2010 | Nickerson |
| 7,857,282 B2 | 12/2010 | Goossens |
| 7,870,080 B2 | 1/2011 | Budike, Jr. |
| 7,877,168 B1 | 1/2011 | Porter |
| RE42,084 E | 2/2011 | Baecklund |
| D633,180 S | 2/2011 | Duong |
| 7,883,027 B2 | 2/2011 | Fekete |
| 7,895,993 B2 | 3/2011 | Weisz |
| 7,899,580 B2 | 3/2011 | Cardinal |
| 7,899,581 B1 | 3/2011 | Woytowitz |
| 7,911,341 B2 | 3/2011 | Raji |
| D636,278 S | 4/2011 | Franchini |
| 7,921,480 B2 | 4/2011 | Parsons |
| 7,922,150 B2 | 4/2011 | Cripps |
| 7,930,069 B2 | 4/2011 | Savelle |
| 7,933,945 B2 | 4/2011 | Krzyzanowski |
| 7,938,340 B2 | 5/2011 | Anderson |
| 7,950,416 B2 | 5/2011 | Nakai |
| 7,953,517 B1 | 5/2011 | Porter |
| 7,959,129 B2 | 6/2011 | Matsumoto |
| 7,962,101 B2 | 6/2011 | Vaswani |
| 7,962,244 B2 | 6/2011 | Alexanian |
| 7,973,627 B2 | 7/2011 | Yamagata |
| 7,978,059 B2 | 7/2011 | Petite |
| 7,981,386 B2 | 7/2011 | McAvoy |
| 7,982,564 B2 | 7/2011 | Farrar |
| 7,982,565 B2 | 7/2011 | Bradfield |
| 7,983,574 B2 | 7/2011 | Kolb |
| 7,996,115 B2 | 8/2011 | Nickerson |
| 8,006,719 B2 | 8/2011 | Nordstrom |
| 8,006,951 B2 | 8/2011 | Guggenmos |
| 8,010,238 B2 | 8/2011 | Ensworth |
| 8,013,732 B2 | 9/2011 | Petite |
| 8,019,482 B2 | 9/2011 | Sutardja |
| 8,024,075 B2 | 9/2011 | Fekete |
| 8,026,781 B2 | 9/2011 | Freakes |
| 8,028,970 B2 | 10/2011 | Fukano |
| 8,031,650 B2 | 10/2011 | Petite |
| 8,037,853 B2 | 10/2011 | Luercho |
| 8,037,901 B2 | 10/2011 | Matsumoto |
| 8,042,049 B2 | 10/2011 | Killian |
| 8,042,202 B2 | 10/2011 | Parsons |
| D648,000 S | 11/2011 | Shimura |
| 8,055,389 B2 | 11/2011 | Holindrake |
| 8,061,685 B2 | 11/2011 | Ueda |
| 8,064,412 B2 | 11/2011 | Petite |
| 8,064,935 B2 | 11/2011 | Shamoon |
| 8,070,129 B2 | 12/2011 | Makino |
| 8,081,053 B2 | 12/2011 | Yamagata |
| 8,104,993 B2 | 1/2012 | Hitt |
| 8,108,078 B2 | 1/2012 | Lorenz |
| 8,116,889 B2 | 2/2012 | Krzyzanowski |
| 8,127,746 B2 | 3/2012 | Escandell |
| 8,127,790 B2 | 3/2012 | Van Weelden |
| 8,127,791 B2 | 3/2012 | Najmolhoda |
| 8,128,059 B2 | 3/2012 | Uechi |
| 8,141,585 B2 | 3/2012 | Tschurtz |
| 8,145,360 B2 | 3/2012 | Brundisini |
| 8,160,750 B2 | 4/2012 | Weiler |
| 8,170,721 B2 | 5/2012 | Nickerson |
| 8,171,136 B2 | 5/2012 | Petite |
| 8,185,248 B2 | 5/2012 | Ensworth |
| 8,186,378 B2 | 5/2012 | Nordstrom |
| 8,188,821 B2 | 5/2012 | Nelson |
| 8,193,930 B2 | 6/2012 | Petite |
| 8,196,064 B2 | 6/2012 | Krzyzanowski |
| 8,200,368 B2 | 6/2012 | Nickerson |
| 8,209,061 B2 | 6/2012 | Palmer |
| 8,212,667 B2 | 7/2012 | Petite |
| 8,214,496 B2 | 7/2012 | Gutt |
| 8,215,327 B2 | 7/2012 | Bush |
| 8,215,610 B2 | 7/2012 | Shiao |
| 8,219,254 B2 | 7/2012 | O'Connor |
| 8,219,935 B2 | 7/2012 | Hunts |
| 8,220,776 B2 | 7/2012 | Tagata |
| 8,223,010 B2 | 7/2012 | Petite |
| 8,224,493 B2 | 7/2012 | Walker |
| 8,225,810 B2 | 7/2012 | Blanchard |
| 8,235,352 B2 | 8/2012 | Irwin |
| 8,244,404 B2 | 8/2012 | Nickerson |
| 8,245,402 B2 | 8/2012 | Seitter |
| 8,246,004 B2 | 8/2012 | Kratzer |
| 8,260,465 B2 | 9/2012 | Crist |
| 8,261,770 B2 | 9/2012 | Bush |
| 8,264,312 B2 | 9/2012 | Hamaoka |
| 8,264,313 B2 | 9/2012 | Sasao |
| 8,265,797 B2 | 9/2012 | Nickerson |
| 8,274,171 B2 | 9/2012 | Korol |
| 8,274,348 B2 | 9/2012 | Kolb |
| 8,276,878 B2 | 10/2012 | Parsons |
| 8,295,985 B2 | 10/2012 | Crist |

(56) References Cited

U.S. PATENT DOCUMENTS

| | | |
|---|---|---|
| 8,297,314 B2 | 10/2012 | Clark |
| 8,297,589 B2 | 10/2012 | Dourdeville |
| 8,301,309 B1 | 10/2012 | Woytoxitz |
| 8,305,168 B2 | 11/2012 | Cotic |
| 8,310,322 B2 | 11/2012 | Tomimbang |
| 8,326,440 B2 | 12/2012 | Christfort |
| 8,335,304 B2 | 12/2012 | Petite |
| 8,335,842 B2 | 12/2012 | Raji |
| 8,347,918 B2 | 1/2013 | Shimizu |
| 8,348,230 B2 | 1/2013 | Michl |
| 8,348,231 B2 | 1/2013 | Czimmek |
| 8,371,331 B2 | 2/2013 | Najmolhoda |
| 8,374,726 B2 | 2/2013 | Holindrake |
| 8,379,564 B2 | 2/2013 | Petite |
| 8,382,064 B2 | 2/2013 | Nisinosono |
| 8,387,653 B2 | 3/2013 | Bush |
| 8,396,606 B2 | 3/2013 | Forbes, Jr. |
| 8,401,705 B2 | 3/2013 | Alexanian |
| 8,410,931 B2 | 4/2013 | Petite |
| 8,412,382 B2 | 4/2013 | Imes |
| 8,416,041 B2 | 4/2013 | Freakes |
| 8,417,390 B2 | 4/2013 | Nickerson |
| 8,421,566 B2 | 4/2013 | Sasao |
| 8,425,020 B2 | 4/2013 | Borra |
| 8,430,376 B1 | 4/2013 | Danner |
| 8,432,242 B2 | 4/2013 | Irwin |
| 8,433,448 B2 | 4/2013 | Walker |
| 8,436,704 B1 | 5/2013 | Venkataraghavan |
| 8,437,879 B2 | 5/2013 | Anderson |
| 8,443,829 B2 | 5/2013 | Czimmek |
| 8,446,884 B2 | 5/2013 | Petite |
| 8,447,843 B2 | 5/2013 | Johnson |
| 8,448,916 B2 | 5/2013 | Kratzer |
| 8,457,798 B2 | 6/2013 | Hackett |
| 8,465,131 B2 | 6/2013 | Hibbard |
| 8,469,334 B2 | 6/2013 | Yamagata |
| 8,474,787 B2 | 7/2013 | Fink |
| 8,478,871 B2 | 7/2013 | Gutt |
| 8,485,619 B2 | 7/2013 | Borra |
| 8,490,646 B2 | 7/2013 | Bush |
| 8,494,683 B2 | 7/2013 | Piper |
| 8,496,025 B2 | 7/2013 | Parsons |
| 8,500,226 B2 | 8/2013 | Hibbard |
| 8,504,210 B2 | 8/2013 | Ensworth |
| 8,505,566 B2 | 8/2013 | Nguyen |
| 8,505,573 B2 | 8/2013 | Herbert |
| 8,516,087 B2 | 8/2013 | Wilson |
| 8,527,549 B2 | 9/2013 | Asaf |
| 8,528,834 B2 | 9/2013 | Skinner |
| 8,529,028 B2 | 9/2013 | Borra |
| 8,532,831 B2 | 9/2013 | Crist |
| 8,534,641 B2 | 9/2013 | Schalowski |
| 8,538,592 B2 | 9/2013 | Alexanian |
| 8,540,353 B2 | 9/2013 | Mallory |
| 8,548,632 B1 | 10/2013 | Porter |
| 8,550,427 B2 | 10/2013 | Yoshida |
| 8,556,227 B2 | 10/2013 | Buestgens |
| 8,556,228 B2 | 10/2013 | Marcichow |
| 8,556,232 B2 | 10/2013 | Oikawa |
| 8,556,393 B2 | 10/2013 | Mallory |
| 8,558,653 B2 | 10/2013 | Wo |
| 8,565,904 B2 | 10/2013 | Kantor |
| 8,567,755 B2 | 10/2013 | Najmolhoda |
| 8,573,255 B2 | 11/2013 | Pifer |
| 8,576,032 B2 | 11/2013 | Herbert |
| 8,579,251 B2 | 11/2013 | Ambrosi |
| 8,581,682 B2 | 11/2013 | Patino |
| 8,584,704 B2 | 11/2013 | Pifer |
| 8,596,774 B2 | 12/2013 | Borra |
| 8,600,569 B2 | 12/2013 | Woytowitz |
| 8,606,415 B1 | 12/2013 | Woytowitz |
| 8,613,420 B2 | 12/2013 | Linortner |
| 8,620,480 B2 | 12/2013 | Alexanian |
| 8,620,481 B2 | 12/2013 | Holindrake |
| 8,630,743 B2 | 1/2014 | Marsters |
| 8,632,050 B2 | 1/2014 | Stoeckel |
| 8,635,350 B2 | 1/2014 | Gutt |
| 8,636,346 B2 | 1/2014 | Borra |
| 8,641,177 B2 | 2/2014 | Borra |
| 8,649,907 B2 | 2/2014 | Ersavas |
| 8,650,069 B2 | 2/2014 | Mason, Sr |
| 8,650,898 B2 | 2/2014 | Ma |
| 8,651,453 B2 | 2/2014 | Heyer |
| 8,659,183 B2 | 2/2014 | Crist |
| 8,659,372 B2 | 2/2014 | Morimura |
| 8,660,705 B2 | 2/2014 | Woytowitz |
| 8,662,471 B2 | 3/2014 | Ohmi |
| 8,662,647 B2 | 3/2014 | Rosati |
| 8,669,836 B2 | 3/2014 | Kulke |
| 8,678,343 B2 | 3/2014 | Czimmek |
| 8,690,118 B2 | 4/2014 | Bunni |
| 8,695,620 B2 | 4/2014 | Bush |
| 8,700,222 B1 | 4/2014 | Woytowitz |
| 8,708,466 B2 | 4/2014 | Mallory |
| 8,712,592 B2 | 4/2014 | Carlson |
| 8,714,519 B2 | 5/2014 | Voss |
| 8,717,133 B2 | 5/2014 | Ooishi |
| 8,720,400 B2 | 5/2014 | Dinkel |
| 8,727,511 B2 | 5/2014 | Mallory |
| 8,733,393 B2 | 5/2014 | Najmolhoda |
| 8,733,395 B2 | 5/2014 | Najmolhoda |
| 8,733,908 B2 | 5/2014 | Borra |
| 8,736,409 B2 | 5/2014 | Mita |
| 8,738,188 B2 | 5/2014 | Nickerson |
| 8,738,189 B2 | 5/2014 | Alexanian |
| D706,389 S | 6/2014 | McLauchlan |
| D706,390 S | 6/2014 | McLauchlan |
| 8,739,830 B2 | 6/2014 | Bradbury |
| 8,740,113 B2 | 6/2014 | Roessle |
| 8,751,052 B1 | 6/2014 | Campbell |
| 8,757,209 B2 | 6/2014 | Morgan |
| 8,757,584 B2 | 6/2014 | Bill |
| 8,757,586 B2 | 6/2014 | Gruen |
| 8,757,587 B2 | 6/2014 | Miura |
| 8,777,388 B2 | 7/2014 | Borra |
| 8,783,653 B2 | 7/2014 | Jamison |
| 8,793,024 B1 | 7/2014 | Woytowitz |
| 8,793,025 B2 | 7/2014 | Lorenz |
| 8,794,748 B2 | 8/2014 | Borra |
| 8,807,725 B2 | 8/2014 | Borra |
| 8,812,007 B2 | 8/2014 | Hitt |
| 8,817,431 B2 | 8/2014 | Tomimbang |
| 8,827,236 B2 | 9/2014 | Mangiafico |
| 8,839,135 B2 | 9/2014 | Vander Griend |
| 8,840,084 B2 | 9/2014 | Crist |
| 8,847,716 B2 | 9/2014 | Fonville |
| 8,849,461 B2 | 9/2014 | Ersavas |
| 8,851,447 B2 | 10/2014 | Crist |
| 8,854,165 B2 | 10/2014 | Irwin |
| 8,862,277 B1 | 10/2014 | Campbell |
| 8,868,246 B2 | 10/2014 | Thornton |
| 8,879,218 B2 | 11/2014 | Tomimbang |
| 8,880,204 B2 | 11/2014 | Frei |
| 8,882,247 B2 | 11/2014 | Borra |
| 8,890,505 B2 | 11/2014 | Forbes, Jr. |
| 8,909,381 B2 | 12/2014 | Crist |
| 8,911,621 B2 | 12/2014 | Lippert |
| 8,924,587 B2 | 12/2014 | Petite |
| 8,924,588 B2 | 12/2014 | Petite |
| 8,924,891 B2 | 12/2014 | Hunts |
| 8,930,032 B2 | 1/2015 | Shupe |
| 8,931,758 B2 | 1/2015 | Kasagi |
| 8,936,041 B2 | 1/2015 | Yun |
| 8,944,100 B2 | 2/2015 | Pifer |
| 8,944,101 B2 | 2/2015 | Pifer |
| 8,948,921 B2 | 2/2015 | Halahan |
| 8,955,822 B2 | 2/2015 | Parsons |
| 8,957,748 B2 | 2/2015 | Tomimbang |
| 8,960,233 B2 | 2/2015 | Nishinosono et al. |
| 8,967,746 B2 | 3/2015 | Borra |
| 8,973,895 B2 | 3/2015 | Thomas |
| 8,977,400 B1 | 3/2015 | Porter |
| 8,985,550 B2 | 3/2015 | Miura |
| 8,991,955 B2 | 3/2015 | Borra |

(56) References Cited

U.S. PATENT DOCUMENTS

| | | |
|---|---|---|
| 8,995,098 B2 | 3/2015 | Tomimbang |
| 8,996,183 B2 | 3/2015 | Forbes, Jr. |
| 8,998,114 B2 | 4/2015 | Olivier |
| D728,746 S | 5/2015 | McLauchlan |
| D728,747 S | 5/2015 | McLauchlan |
| 9,032,998 B2 | 5/2015 | O'Brien |
| 9,043,036 B2 | 5/2015 | Fekete |
| 9,049,821 B1 | 6/2015 | Hanna |
| 9,068,663 B2 | 6/2015 | Zhang |
| 9,069,337 B2 | 6/2015 | Forbes, Jr. |
| 9,074,699 B2 | 7/2015 | Jamison |
| 9,114,365 B2 | 8/2015 | Schmitt |
| 9,117,577 B2 | 8/2015 | Zurke |
| 9,127,780 B2 | 9/2015 | Schnelker |
| 9,130,402 B2 | 9/2015 | Forbes, Jr. |
| 9,131,642 B2 | 9/2015 | Groeneveld |
| 9,140,378 B2 | 9/2015 | Da Pont |
| 9,149,013 B2 | 10/2015 | Andrews |
| 9,157,545 B2 | 10/2015 | Czimmek |
| 9,161,499 B2 | 10/2015 | Bailey |
| 9,169,626 B2 | 10/2015 | Guler |
| 9,169,941 B2 | 10/2015 | Lee |
| 9,183,163 B2 | 11/2015 | Frei |
| 9,184,524 B2 | 11/2015 | Tomita |
| 9,185,365 B2 | 11/2015 | Hong |
| 9,192,110 B2 | 11/2015 | Standerfer |
| 9,201,815 B2 | 12/2015 | Frei |
| 9,208,676 B2 | 12/2015 | Fadell |
| 9,222,593 B1 | 12/2015 | Clark |
| D747,784 S | 1/2016 | McLauchlan |
| 9,241,451 B2 | 1/2016 | Ersavas |
| 9,244,449 B2 | 1/2016 | Tennyson |
| 9,249,895 B2 | 2/2016 | Hettinger |
| 9,258,952 B2 | 2/2016 | Walker |
| D750,746 S | 3/2016 | McLauchlan |
| 9,279,756 B2 | 3/2016 | Bush |
| 9,288,102 B2 | 3/2016 | Sobhy |
| 9,301,460 B2 | 4/2016 | Runge |
| 9,305,694 B2 | 4/2016 | Shimizu |
| 9,320,205 B2 | 4/2016 | Ensworth |
| 9,343,853 B2 | 5/2016 | Okada |
| 9,348,338 B2 | 5/2016 | Nickerson |
| 9,366,351 B2 | 6/2016 | Engler |
| 9,371,803 B2 | 6/2016 | Pifer |
| 9,377,123 B2 | 6/2016 | Kibune |
| 9,389,157 B2 | 7/2016 | Bush |
| 9,395,010 B2 | 7/2016 | Jamison |
| 9,416,883 B2 | 8/2016 | Van Den Bijgaart |
| 9,425,978 B2 | 8/2016 | Frei |
| 9,435,460 B2 | 9/2016 | Herbert |
| 9,470,332 B2 | 10/2016 | Miura |
| 9,488,097 B2 | 11/2016 | Steinman |
| 9,493,936 B2 | 11/2016 | Bush |
| 9,500,291 B2 | 11/2016 | Lee |
| 9,528,626 B2 | 12/2016 | Holmes |
| 9,551,427 B2 | 1/2017 | Van Den Bijgaart |
| 9,583,248 B2 | 2/2017 | Toda |
| 9,598,847 B2 | 3/2017 | Marcichow |
| 9,602,655 B2 | 3/2017 | Shamoon |
| 9,627,121 B2 | 4/2017 | Peterson |
| 9,665,106 B2 | 5/2017 | Lorenz |
| 9,678,485 B2 | 6/2017 | Malaugh |
| 9,679,690 B2 | 6/2017 | Nila |
| 9,681,610 B2 | 6/2017 | Crist |
| 9,683,472 B2 | 6/2017 | Thomas |
| 9,703,275 B2 | 7/2017 | Ersavas |
| 9,704,122 B2 | 7/2017 | Jung |
| 9,733,274 B2 | 8/2017 | Pietrowicz |
| 9,746,097 B1 | 8/2017 | Ishii |
| 9,756,797 B2 | 9/2017 | Sarver |
| 9,763,393 B2 | 9/2017 | Parsons |
| 9,766,609 B2 | 9/2017 | Kah, Jr. |
| 9,781,887 B2 | 10/2017 | Woytowitz |
| 9,800,463 B2 | 10/2017 | Imes |
| 9,814,190 B1 | 11/2017 | Stange |
| 9,822,514 B2 | 11/2017 | Parsons |
| 9,829,869 B2 | 11/2017 | Ersavas |
| 9,832,939 B2 | 12/2017 | Russell |
| 9,872,445 B2 | 1/2018 | Cline |
| 9,927,045 B2 | 3/2018 | Morgan |
| 9,945,492 B2 | 4/2018 | Timmermans |
| 9,978,553 B2 | 5/2018 | Tomimbang |
| 10,024,448 B2 | 7/2018 | Watanabe |
| 10,041,401 B2 | 8/2018 | Lenk |
| 10,058,042 B2 | 8/2018 | Crist |
| D829,304 S | 9/2018 | McLauchlan |
| 10,070,596 B2 | 9/2018 | Crist |
| 10,125,890 B2 | 11/2018 | Sebastian |
| 10,139,006 B2 | 11/2018 | Muraoka |
| 10,151,399 B2 | 12/2018 | Muraoka |
| 10,188,050 B2 | 1/2019 | Walker |
| 10,194,599 B2 | 2/2019 | Ensworth |
| 10,201,133 B2 | 2/2019 | Tennyson |
| 10,214,191 B2 | 2/2019 | Dreyer |
| 10,288,188 B2 | 5/2019 | Schieweck |
| 10,362,739 B2 | 7/2019 | Ersavas |
| 10,388,446 B2 | 8/2019 | Ott |
| 10,390,502 B2 | 8/2019 | Lorenz |
| 10,502,337 B2 | 12/2019 | Koyama |
| 10,716,269 B2 | 7/2020 | Ersavas |
| 10,772,267 B2 | 9/2020 | Tennyson |
| 2001/0002210 A1 | 5/2001 | Petite |
| 2001/0024163 A1 | 9/2001 | Petite |
| 2001/0049563 A1 | 12/2001 | Addink |
| 2002/0002425 A1 | 1/2002 | Dossey |
| 2002/0012323 A1 | 1/2002 | Petite |
| 2002/0013679 A1 | 1/2002 | Petite |
| 2002/0019712 A1 | 2/2002 | Petite |
| 2002/0019725 A1 | 2/2002 | Petite |
| 2002/0027504 A1 | 3/2002 | Davis |
| 2002/0031101 A1 | 3/2002 | Petite |
| 2002/0035414 A1 | 3/2002 | Morikawa |
| 2002/0053970 A1 | 5/2002 | Plummer |
| 2002/0071234 A1 | 6/2002 | Alexanian |
| 2002/0085333 A1 | 7/2002 | Alexanian |
| 2002/0088875 A1 | 7/2002 | Sirkin |
| 2002/0091452 A1 | 7/2002 | Addink |
| 2002/0096655 A1 | 7/2002 | Balsdon |
| 2002/0109608 A1 | 8/2002 | Petite |
| 2002/0125998 A1 | 9/2002 | Petite |
| 2002/0130287 A1 | 9/2002 | Smith |
| 2002/0138969 A1 | 10/2002 | Dallmeyer |
| 2002/0145125 A1 | 10/2002 | Tomoda |
| 2002/0166986 A1 | 11/2002 | Remby |
| 2002/0169643 A1 | 11/2002 | Petite |
| 2003/0006882 A1 | 1/2003 | Buhler |
| 2003/0036810 A1 | 2/2003 | Petite |
| 2003/0036822 A1 | 2/2003 | Davis |
| 2003/0042451 A1 | 3/2003 | Bendzinski |
| 2003/0051759 A1 | 3/2003 | Schmidt |
| 2003/0067889 A1 | 4/2003 | Petite |
| 2003/0078029 A1 | 4/2003 | Petite |
| 2003/0093159 A1 | 5/2003 | Sieminski |
| 2003/0093484 A1 | 5/2003 | Petite |
| 2003/0102453 A1 | 6/2003 | Fukano |
| 2003/0120393 A1 | 6/2003 | Bailey |
| 2003/0135286 A1 | 7/2003 | Brundisini |
| 2003/0179102 A1 | 9/2003 | Barnes |
| 2003/0201675 A1 | 10/2003 | Alexanian |
| 2004/0015270 A1 | 1/2004 | Addink |
| 2004/0020538 A1 | 2/2004 | Antunez |
| 2004/0039489 A1 | 2/2004 | Moore |
| 2004/0046137 A1 | 3/2004 | Herbert |
| 2004/0051069 A1 | 3/2004 | Miyazoe |
| 2004/0053639 A1 | 3/2004 | Petite |
| 2004/0070302 A1 | 4/2004 | Parker |
| 2004/0083833 A1 | 5/2004 | Hitt |
| 2004/0086053 A1 | 5/2004 | Anderson |
| 2004/0088083 A1 | 5/2004 | Davis |
| 2004/0090329 A1 | 5/2004 | Hitt |
| 2004/0090345 A1 | 5/2004 | Hitt |
| 2004/0100394 A1 | 5/2004 | Hitt |
| 2004/0183687 A1 | 9/2004 | Petite |
| 2004/0225412 A1 | 11/2004 | Alexanian |

(56) References Cited

U.S. PATENT DOCUMENTS

| | | |
|---|---|---|
| 2005/0000579 A1 | 1/2005 | Burrola |
| 2005/0004715 A1 | 1/2005 | Christiansen |
| 2005/0030199 A1 | 2/2005 | Petite |
| 2005/0038529 A1 | 2/2005 | Perez |
| 2005/0043059 A1 | 2/2005 | Petite |
| 2005/0043860 A1 | 2/2005 | Petite |
| 2005/0055106 A1 | 3/2005 | Beutler |
| 2005/0087620 A1 | 4/2005 | Bowers |
| 2005/0090936 A1 | 4/2005 | Hitt |
| 2005/0098752 A1 | 5/2005 | Burrola |
| 2005/0150560 A1 | 7/2005 | Amato |
| 2005/0156067 A1 | 7/2005 | Ivans |
| 2005/0156068 A1 | 7/2005 | Ivans |
| 2005/0171646 A1 | 8/2005 | Miller |
| 2005/0190055 A1 | 9/2005 | Petite |
| 2005/0192710 A1 | 9/2005 | Thornton |
| 2005/0195768 A1 | 9/2005 | Petite |
| 2005/0195775 A1 | 9/2005 | Petite |
| 2005/0201397 A1 | 9/2005 | Petite |
| 2005/0216580 A1 | 9/2005 | Raji |
| 2005/0243867 A1 | 11/2005 | Petite |
| 2005/0264973 A1 | 12/2005 | Gardner |
| 2005/0273205 A1 | 12/2005 | Nickerson |
| 2006/0009928 A1 | 1/2006 | Addink |
| 2006/0029060 A1 | 2/2006 | Pister |
| 2006/0029061 A1 | 2/2006 | Pister |
| 2006/0043208 A1 | 3/2006 | Graham |
| 2006/0049271 A1 | 3/2006 | Hitt |
| 2006/0076527 A1 | 4/2006 | Bush |
| 2006/0080003 A1 | 4/2006 | Christiansen |
| 2006/0091245 A1 | 5/2006 | Ivans |
| 2006/0108552 A1 | 5/2006 | Herbert |
| 2006/0116793 A1 | 6/2006 | Christiansen |
| 2006/0122735 A1 | 6/2006 | Goldberg |
| 2006/0155489 A1 | 7/2006 | Addink |
| 2006/0161309 A1 | 7/2006 | Moore |
| 2006/0178847 A1 | 8/2006 | Glancy |
| 2006/0181406 A1 | 8/2006 | Petite |
| 2006/0184285 A1 | 8/2006 | Evelyn-Veere |
| 2006/0185654 A1 | 8/2006 | Modien |
| 2006/0206239 A1 | 9/2006 | Christiansen |
| 2006/0271297 A1 | 11/2006 | Repelli |
| 2006/0272830 A1 | 12/2006 | Fima |
| 2006/0282467 A1 | 12/2006 | Peterson |
| 2006/0293797 A1 | 12/2006 | Weiler |
| 2007/0010915 A1 | 1/2007 | Burson |
| 2007/0016334 A1 | 1/2007 | Smith |
| 2007/0035907 A1 | 2/2007 | Doering |
| 2007/0039745 A1 | 2/2007 | Anderson |
| 2007/0057217 A1 | 3/2007 | Kamidate |
| 2007/0061048 A1 | 3/2007 | Lorenz |
| 2007/0088462 A1 | 4/2007 | Peleg |
| 2007/0106426 A1 | 5/2007 | Ensworth |
| 2007/0112939 A1 | 5/2007 | Wilson |
| 2007/0135973 A1 | 6/2007 | Petite |
| 2007/0140274 A1 | 6/2007 | Battistutto |
| 2007/0179674 A1 | 8/2007 | Ensworth |
| 2007/0191991 A1 | 8/2007 | Addink |
| 2007/0192486 A1 | 8/2007 | Wilson |
| 2007/0203860 A1 | 8/2007 | Golden |
| 2007/0208521 A1 | 9/2007 | Petite |
| 2007/0221750 A1 | 9/2007 | Roberts |
| 2007/0222581 A1 | 9/2007 | Hawkins |
| 2007/0239317 A1 | 10/2007 | Bogolea |
| 2007/0257757 A1 | 11/2007 | Kolb |
| 2007/0261245 A1 | 11/2007 | Hayashi |
| 2007/0282486 A1 | 12/2007 | Walker |
| 2007/0286210 A1 | 12/2007 | Gutt |
| 2007/0286369 A1 | 12/2007 | Gutt |
| 2007/0291689 A1 | 12/2007 | Kapur |
| 2007/0293990 A1 | 12/2007 | Alexanain |
| 2008/0001595 A1 | 1/2008 | Ha |
| 2008/0027586 A1 | 1/2008 | Hern |
| 2008/0027587 A1 | 1/2008 | Nickerson |
| 2008/0033775 A1 | 2/2008 | Dawson |
| 2008/0039978 A1 | 2/2008 | Graham |
| 2008/0040509 A1 | 2/2008 | Werb |
| 2008/0051036 A1 | 2/2008 | Vaswani |
| 2008/0058995 A1 | 3/2008 | Holindrake |
| 2008/0097653 A1 | 4/2008 | Kaprielian |
| 2008/0119948 A1 | 5/2008 | O'Connor |
| 2008/0129495 A1 | 6/2008 | Hitt |
| 2008/0136620 A1 | 6/2008 | Lee |
| 2008/0147205 A1 | 6/2008 | Ollis |
| 2008/0148725 A1 | 6/2008 | Jacobsen |
| 2008/0154437 A1 | 6/2008 | Alexanian |
| 2008/0157995 A1 | 7/2008 | Crist |
| 2008/0180240 A1 | 7/2008 | Raji |
| 2008/0183842 A1 | 7/2008 | Raji |
| 2008/0199359 A1 | 8/2008 | Davis |
| 2008/0204176 A1 | 8/2008 | Sriraksat |
| 2008/0211307 A1 | 9/2008 | Gardner |
| 2008/0253327 A1 | 10/2008 | Kohvakka |
| 2008/0272208 A1 | 11/2008 | Anderson |
| 2008/0275595 A1 | 11/2008 | Bailey |
| 2008/0288116 A1 | 11/2008 | Nickerson |
| 2008/0288117 A1 | 11/2008 | Nickerson |
| 2008/0289693 A1 | 11/2008 | Irwin |
| 2008/0297288 A1 | 12/2008 | Irwin |
| 2008/0302172 A1 | 12/2008 | Kates |
| 2008/0309441 A1 | 12/2008 | Anderson |
| 2008/0319585 A1 | 12/2008 | Nickerson |
| 2009/0006617 A1 | 1/2009 | Petite |
| 2009/0007706 A1 | 1/2009 | Hitt |
| 2009/0008471 A1 | 1/2009 | Wilson |
| 2009/0008472 A1 | 1/2009 | Wilson |
| 2009/0043427 A1 | 2/2009 | Addink |
| 2009/0068947 A1 | 3/2009 | Petite |
| 2009/0076659 A1 | 3/2009 | Ensworth |
| 2009/0076660 A1 | 3/2009 | Goldberg |
| 2009/0094097 A1 | 4/2009 | Gardenswartz |
| 2009/0096605 A1 | 4/2009 | Petite |
| 2009/0099701 A1 | 4/2009 | Li |
| 2009/0101855 A1 | 4/2009 | Nguyen |
| 2009/0120521 A1 | 5/2009 | Clark |
| 2009/0121049 A1 | 5/2009 | Flynn |
| 2009/0138105 A1 | 5/2009 | Crawford |
| 2009/0138131 A1 | 5/2009 | Uy |
| 2009/0145974 A1 | 6/2009 | Fekete |
| 2009/0150001 A1 | 6/2009 | Fekete |
| 2009/0150002 A1 | 6/2009 | Fekete |
| 2009/0168678 A1 | 7/2009 | Han |
| 2009/0177330 A1 | 7/2009 | Kah |
| 2009/0204265 A1 | 8/2009 | Hackett |
| 2009/0211096 A1 | 8/2009 | Seitter |
| 2009/0212248 A1 | 8/2009 | Kozak |
| 2009/0215424 A1 | 8/2009 | Petite |
| 2009/0216345 A1 | 8/2009 | Christfort |
| 2009/0217189 A1 | 8/2009 | Martin |
| 2009/0217194 A1 | 8/2009 | Martin |
| 2009/0222140 A1 | 9/2009 | Christiansen |
| 2009/0222141 A1 | 9/2009 | Ensworth |
| 2009/0222921 A1 | 9/2009 | Mukhopadhyay |
| 2009/0223128 A1 | 9/2009 | Kuschak |
| 2009/0243840 A1 | 10/2009 | Petite |
| 2009/0267008 A1 | 10/2009 | Lucas |
| 2009/0271045 A1 | 10/2009 | Savelle |
| 2009/0276102 A1 | 11/2009 | Smith |
| 2009/0277506 A1 | 11/2009 | Bradbury |
| 2009/0281672 A1 | 11/2009 | Pourzia |
| 2009/0291575 A1 | 11/2009 | Henry |
| 2009/0292401 A1 | 11/2009 | Kah |
| 2009/0302870 A1 | 12/2009 | Paterson |
| 2009/0308460 A1 | 12/2009 | Tschurtz |
| 2009/0309755 A1 | 12/2009 | Williamson |
| 2009/0319934 A1 | 12/2009 | Hunts |
| 2009/0326723 A1 | 12/2009 | Moore |
| 2009/0328176 A1 | 12/2009 | Martin |
| 2010/0001223 A1 | 1/2010 | Tschurtz |
| 2010/0004789 A1 | 1/2010 | Savelle |
| 2010/0019181 A1 | 1/2010 | Herbert |
| 2010/0030389 A1 | 2/2010 | Palmer |
| 2010/0030476 A1 | 2/2010 | Woytowitz |
| 2010/0038440 A1 | 2/2010 | Ersavas |

(56) References Cited

U.S. PATENT DOCUMENTS

| | | |
|---|---|---|
| 2010/0042263 A1 | 2/2010 | Jacobsen |
| 2010/0049563 A1 | 2/2010 | Lopez Seco |
| 2010/0059698 A1 | 3/2010 | Guggenmos |
| 2010/0078584 A1 | 4/2010 | Van Den Bijgaart |
| 2010/0082169 A1 | 4/2010 | Crist |
| 2010/0082744 A1 | 4/2010 | Raji |
| 2010/0084591 A1 | 4/2010 | Shiao |
| 2010/0094472 A1 | 4/2010 | Woytowitz |
| 2010/0094923 A1 | 4/2010 | Martinez |
| 2010/0095111 A1 | 4/2010 | Gutt |
| 2010/0095369 A1 | 4/2010 | Gutt |
| 2010/0097733 A1 | 4/2010 | Tomimbang |
| 2010/0100247 A1 | 4/2010 | Nickerson |
| 2010/0109685 A1 | 5/2010 | Morton |
| 2010/0111727 A1 | 5/2010 | Yamagata |
| 2010/0122733 A1 | 5/2010 | Grygus |
| 2010/0123535 A1 | 5/2010 | Yamagata |
| 2010/0131119 A1 | 5/2010 | Brundisini |
| 2010/0145530 A1 | 6/2010 | Nickerson |
| 2010/0145531 A1 | 6/2010 | Nickerson |
| 2010/0147389 A1 | 6/2010 | Blanchard |
| 2010/0152909 A1 | 6/2010 | Hitt |
| 2010/0155638 A1 | 6/2010 | Zurke |
| 2010/0161144 A1 | 6/2010 | Crist |
| 2010/0179701 A1 | 7/2010 | Gilbert |
| 2010/0187457 A1 | 7/2010 | Kratzer |
| 2010/0187458 A1 | 7/2010 | Ueda |
| 2010/0193720 A1 | 8/2010 | Cripps |
| 2010/0194582 A1 | 8/2010 | Petite |
| 2010/0198712 A1 | 8/2010 | Benisti |
| 2010/0218833 A1 | 9/2010 | Bush |
| 2010/0222932 A1 | 9/2010 | O'Connor |
| 2010/0250054 A1 | 9/2010 | Petite |
| 2010/0251807 A1 | 10/2010 | Morton |
| 2010/0252760 A1 | 10/2010 | Hettinger |
| 2010/0252769 A1 | 10/2010 | Goepfert |
| 2010/0256827 A1 | 10/2010 | Bragg |
| 2010/0265909 A1 | 10/2010 | Petite |
| 2010/0268391 A1 | 10/2010 | Anderson |
| 2010/0268392 A1 | 10/2010 | Korol |
| 2010/0269923 A1 | 10/2010 | Parsons |
| 2010/0289411 A1 | 11/2010 | Smits |
| 2010/0294971 A1 | 11/2010 | Hajjar |
| 2010/0308245 A1 | 12/2010 | Fink |
| 2010/0312881 A1 | 12/2010 | Davis |
| 2010/0313980 A1 | 12/2010 | Shimizu |
| 2010/0314567 A1 | 12/2010 | Uechi |
| 2010/0324987 A1 | 12/2010 | Benisti |
| 2010/0325005 A1 | 12/2010 | Benisti |
| 2010/0327199 A1 | 12/2010 | Linortner |
| 2011/0001072 A1 | 1/2011 | Tagata |
| 2011/0005481 A1 | 1/2011 | Dinkel |
| 2011/0011783 A1 | 1/2011 | Lippert |
| 2011/0012041 A1 | 1/2011 | De Santis |
| 2011/0015793 A1 | 1/2011 | Crist |
| 2011/0015794 A1 | 1/2011 | Lorenz |
| 2011/0015800 A1 | 1/2011 | Crist |
| 2011/0017845 A1 | 1/2011 | Crist |
| 2011/0024665 A1 | 2/2011 | Hajjar |
| 2011/0035059 A1 | 2/2011 | Ersavas |
| 2011/0035064 A1 | 2/2011 | Kah |
| 2011/0037006 A1 | 2/2011 | Zurke |
| 2011/0040415 A1 | 2/2011 | Nickerson |
| 2011/0040416 A1 | 2/2011 | Nickerson |
| 2011/0042598 A1 | 2/2011 | Kozak |
| 2011/0043230 A1 | 2/2011 | Morton |
| 2011/0049405 A1 | 3/2011 | Bill |
| 2011/0054642 A1 | 3/2011 | Bondar |
| 2011/0057133 A1 | 3/2011 | Nisinosono |
| 2011/0062361 A1 | 3/2011 | Yoshida |
| 2011/0068286 A1 | 3/2011 | Nomichi |
| 2011/0073188 A1 | 3/2011 | Marcus |
| 2011/0073788 A1 | 3/2011 | Marcus |
| 2011/0073791 A1 | 3/2011 | Oikawa |
| 2011/0077785 A1 | 3/2011 | Nickerson |
| 2011/0079740 A1 | 4/2011 | Bill |
| 2011/0080240 A1 | 4/2011 | Patino |
| 2011/0093123 A1 | 4/2011 | Alexanian |
| 2011/0111700 A1 | 5/2011 | Hackett |
| 2011/0121217 A1 | 5/2011 | Ohmi |
| 2011/0147629 A1 | 6/2011 | Gruen |
| 2011/0148552 A1 | 6/2011 | Tomimbang |
| 2011/0148555 A1 | 6/2011 | Sasao |
| 2011/0155934 A1 | 6/2011 | Guler |
| 2011/0168813 A1 | 7/2011 | Bunni |
| 2011/0168929 A1 | 7/2011 | Buestgens |
| 2011/0180464 A1 | 7/2011 | Schmitt |
| 2011/0180736 A1 | 7/2011 | Mangiafico |
| 2011/0186760 A1 | 8/2011 | Michl |
| 2011/0190947 A1 | 8/2011 | Savelle |
| 2011/0190948 A1 | 8/2011 | Fekete |
| 2011/0198522 A1 | 8/2011 | Ambrosi |
| 2011/0204272 A1 | 8/2011 | Kratzer |
| 2011/0212700 A1 | 9/2011 | Petite |
| 2011/0215271 A1 | 9/2011 | Voss |
| 2011/0224836 A1 | 9/2011 | Hern |
| 2011/0227676 A1 | 9/2011 | Cotic |
| 2011/0238228 A1 | 9/2011 | Woytowitz |
| 2011/0248198 A1 | 10/2011 | Huang |
| 2011/0248805 A1 | 10/2011 | Hamaoka |
| 2011/0264324 A1 | 10/2011 | Petite |
| 2011/0270448 A1 | 11/2011 | Kantor |
| 2011/0279576 A1 | 11/2011 | Borra |
| 2011/0279577 A1 | 11/2011 | Borra |
| 2011/0279579 A1 | 11/2011 | Borra |
| 2011/0288690 A1 | 11/2011 | Ensworth |
| 2011/0301767 A1 | 12/2011 | Alexanian |
| 2011/0302708 A1 | 12/2011 | Parsons |
| 2011/0309953 A1 | 12/2011 | Petite |
| 2011/0310929 A1 | 12/2011 | Petite |
| 2011/0320050 A1 | 12/2011 | Petite |
| 2012/0041606 A1 | 2/2012 | Standerfer |
| 2012/0068096 A1 | 3/2012 | Herbert |
| 2012/0072036 A1 | 3/2012 | Piper |
| 2012/0072037 A1 | 3/2012 | Alexanian |
| 2012/0075092 A1 | 3/2012 | Petite |
| 2012/0078425 A1 | 3/2012 | Gardenswartz |
| 2012/0084115 A1 | 4/2012 | Cline |
| 2012/0085950 A1 | 4/2012 | Lorenz |
| 2012/0089259 A1 | 4/2012 | Williams |
| 2012/0089373 A1 | 4/2012 | Hong |
| 2012/0092154 A1 | 4/2012 | Petite |
| 2012/0095604 A1 | 4/2012 | Alexanian |
| 2012/0109387 A1 | 5/2012 | Martin |
| 2012/0132296 A1 | 5/2012 | Parsons |
| 2012/0191261 A1 | 7/2012 | Nickerson |
| 2012/0203383 A1 | 8/2012 | Holindrake |
| 2012/0205568 A1 | 8/2012 | Bush |
| 2012/0214532 A1 | 8/2012 | Petite |
| 2012/0221154 A1 | 8/2012 | Runge |
| 2012/0221718 A1 | 8/2012 | Imes |
| 2012/0222634 A1 | 9/2012 | Dinkel |
| 2012/0232708 A1 | 9/2012 | Ensworth |
| 2012/0239211 A1 | 9/2012 | Walker |
| 2012/0239807 A1 | 9/2012 | Davis |
| 2012/0239808 A1 | 9/2012 | Davis |
| 2012/0253529 A1 | 10/2012 | Carlson |
| 2012/0266095 A1 | 10/2012 | Killian |
| 2012/0273704 A1 | 11/2012 | O'Connor |
| 2012/0290139 A1 | 11/2012 | Brundisini |
| 2012/0290140 A1 | 11/2012 | Groeneveld |
| 2012/0303168 A1 | 11/2012 | Halahan |
| 2012/0303169 A1 | 11/2012 | Crist |
| 2013/0002012 A1 | 1/2013 | Korol |
| 2013/0025721 A1 | 1/2013 | Yun |
| 2013/0035774 A1 | 2/2013 | Warren |
| 2013/0048746 A1 | 2/2013 | Littrell |
| 2013/0060389 A1 | 3/2013 | Marsters |
| 2013/0061380 A1 | 3/2013 | Parsons |
| 2013/0061381 A1 | 3/2013 | Parsons |
| 2013/0063231 A1 | 3/2013 | Tomimbang |
| 2013/0085619 A1 | 4/2013 | Howard |
| 2013/0110293 A1 | 5/2013 | Illig |
| 2013/0116837 A1 | 5/2013 | Malaugh |

(56) References Cited

U.S. PATENT DOCUMENTS

| | | |
|---|---|---|
| 2013/0131874 A1 | 5/2013 | Shupe |
| 2013/0162390 A1 | 6/2013 | Ersavas |
| 2013/0173070 A1 | 7/2013 | Tennyson |
| 2013/0190934 A1 | 7/2013 | Holindrake |
| 2013/0207771 A1 | 8/2013 | Ersavas |
| 2013/0226357 A1 | 8/2013 | Ersavas |
| 2013/0264506 A1 | 10/2013 | Schnelker |
| 2013/0264507 A1 | 10/2013 | Schnelker |
| 2013/0274932 A1 | 10/2013 | Curren |
| 2013/0284960 A1 | 10/2013 | Schnelker |
| 2013/0297082 A1 | 11/2013 | Ensworth |
| 2013/0306891 A1 | 11/2013 | Fietz |
| 2013/0310992 A1 | 11/2013 | Larsen |
| 2013/0318231 A1 | 11/2013 | Raji |
| 2014/0005810 A1 | 1/2014 | Frei |
| 2014/0005843 A1 | 1/2014 | Thomas |
| 2014/0005851 A1 | 1/2014 | Frei |
| 2014/0006506 A1 | 1/2014 | Frei |
| 2014/0018965 A1 | 1/2014 | Pearson |
| 2014/0020379 A1 | 1/2014 | Steinman |
| 2014/0020663 A1 | 1/2014 | Pifer |
| 2014/0039696 A1 | 2/2014 | Andrews |
| 2014/0039698 A1 | 2/2014 | Crist |
| 2014/0081471 A1 | 3/2014 | Woytowitz |
| 2014/0084194 A1 | 3/2014 | Kibune |
| 2014/0088770 A1 | 3/2014 | Masters |
| 2014/0124044 A1 | 5/2014 | Garcia |
| 2014/0129039 A1 | 5/2014 | Olive-Chahinian |
| 2014/0143397 A1 | 5/2014 | Gutt |
| 2014/0172180 A1 | 6/2014 | Woytowitz |
| 2014/0203200 A1 | 7/2014 | Da Silva |
| 2014/0222223 A1 | 8/2014 | Horton |
| 2014/0229024 A1 | 8/2014 | Wang |
| 2014/0236868 A1 | 8/2014 | Cook |
| 2014/0239211 A1 | 8/2014 | Morgan |
| 2014/0245160 A1 | 8/2014 | Bauer |
| 2014/0258474 A1 | 9/2014 | Kim |
| 2014/0264114 A1 | 9/2014 | Martin |
| 2014/0297049 A1 | 10/2014 | Lorenz |
| 2014/0361206 A1 | 12/2014 | Holmes |
| 2014/0367595 A1 | 12/2014 | Miura |
| 2014/0371928 A1 | 12/2014 | Ersavas |
| 2014/0374512 A1 | 12/2014 | Honjo |
| 2015/0005965 A1 | 1/2015 | Ensworth |
| 2015/0019031 A1 | 1/2015 | Crist |
| 2015/0047897 A1 | 2/2015 | Zimet |
| 2015/0088324 A1 | 3/2015 | Crist |
| 2015/0102243 A1 | 4/2015 | Timmermans |
| 2015/0147119 A1 | 5/2015 | Christiansen |
| 2015/0279538 A1 | 10/2015 | Toda |
| 2015/0280541 A1 | 10/2015 | Ando |
| 2015/0380143 A1 | 12/2015 | Saiki |
| 2016/0092600 A1 | 3/2016 | Chan |
| 2016/0113219 A1 | 4/2016 | Tennyson |
| 2016/0113220 A1 | 4/2016 | Walker |
| 2016/0123490 A1 | 5/2016 | McLauchlan |
| 2016/0135389 A1 | 5/2016 | Ersavas |
| 2016/0157446 A1 | 6/2016 | Bentwich |
| 2016/0198646 A1 | 7/2016 | Ensworth |
| 2016/0295819 A1 | 10/2016 | Porter |
| 2017/0081028 A1 | 3/2017 | Jones |
| 2017/0094918 A1 | 4/2017 | Crist |
| 2017/0191580 A1 | 7/2017 | Pifer |
| 2017/0223911 A1 | 8/2017 | Lorenz |
| 2017/0234445 A1 | 8/2017 | Watanabe |
| 2017/0290277 A1* | 10/2017 | Cohen ............... A01G 25/023 |
| 2017/0322527 A1 | 11/2017 | Ersavas |
| 2017/0367277 A1 | 12/2017 | Mohindra |
| 2017/0370495 A1 | 12/2017 | Markley |
| 2018/0085763 A1* | 3/2018 | Leckner ............... B05B 1/16 |
| 2018/0231139 A1 | 8/2018 | Morgan |
| 2018/0279566 A1* | 10/2018 | Wlassich ............. A01G 25/162 |
| 2018/0332784 A1 | 11/2018 | Crist |
| 2018/0338436 A1 | 11/2018 | Crist |
| 2018/0341764 A1 | 11/2018 | Chou |
| 2018/0368261 A1 | 12/2018 | Kwak |
| 2019/0078543 A1 | 3/2019 | Yamazaki |
| 2019/0116743 A1 | 4/2019 | Ensworth |
| 2019/0150381 A1 | 5/2019 | Tennyson |
| 2019/0307084 A1 | 10/2019 | Ersavas |
| 2019/0313590 A1 | 10/2019 | Wlassich |
| 2019/0327920 A1 | 10/2019 | Lorenz |
| 2019/0373827 A1* | 12/2019 | Ensworth ............ A01G 25/023 |
| 2020/0238321 A1 | 7/2020 | Lichte |
| 2020/0245574 A1 | 8/2020 | Woytowitz |
| 2020/0359580 A1* | 11/2020 | Montgomery ......... H02S 40/38 |

FOREIGN PATENT DOCUMENTS

| | | |
|---|---|---|
| CN | 1511383 | 7/2004 |
| CN | 101021729 A | 8/2007 |
| CN | 101849494 A | 10/2010 |
| CN | 102483628 A | 5/2012 |
| CN | 101849494 B | 11/2014 |
| CN | 102483628 B | 3/2016 |
| CN | 207767157 U * | 8/2018 |
| DE | 102011055586 A1 | 5/2013 |
| EP | 0748584 A1 | 12/1996 |
| EP | 1324166 A2 | 7/2003 |
| EP | 1763990 A2 | 3/2007 |
| EP | 1798907 | 6/2007 |
| EP | 2215906 A1 | 8/2010 |
| EP | 2281445 | 2/2011 |
| EP | 2281445 A2 | 2/2011 |
| EP | 3010027 A2 | 4/2016 |
| EP | 3301692 A1 | 4/2018 |
| ES | 2209614 A1 | 6/2004 |
| GB | 2177582 A | 1/1987 |
| JP | 2010034223 A | 2/2010 |
| TR | 200900883 A2 | 2/2009 |
| TR | 200805998 A2 | 12/2009 |
| WO | 8606579 A1 | 11/1986 |
| WO | 9708942 A1 | 3/1997 |
| WO | 1999039567 | 8/1999 |
| WO | 2001095277 | 12/2001 |
| WO | 0235193 A2 | 5/2002 |
| WO | 02058254 A1 | 7/2002 |
| WO | 2004040415 A2 | 5/2004 |
| WO | 2005002321 A2 | 1/2005 |
| WO | 2007104152 A2 | 9/2007 |
| WO | 2007131169 | 11/2007 |
| WO | 2009132425 A1 | 11/2009 |
| WO | 2010019109 | 2/2010 |
| WO | 2011017059 A2 | 2/2011 |
| WO | 2011044289 | 4/2011 |
| WO | 2011044289 A1 | 4/2011 |
| WO | 2012153893 A1 | 11/2012 |
| WO | 2016007159 A1 | 1/2016 |
| WO | 2016027506 A1 | 2/2016 |
| WO | 2019211820 A1 | 11/2019 |

OTHER PUBLICATIONS

USPTO; U.S. Appl. No. 16/007,007; Notice of Allowance dated Dec. 7, 2020; (pp. 1-7).
USPTO; U.S. Appl. No. 15/937,267; Office Action dated Dec. 11, 2020; (pp. 1-22).
Andwin Circuits Co., Limited, Andwin Circuits PCB Expert, Rigid Flex PCB (Printed Circuit Boards), copyright 2015, [online]. Retrieved from the Internet: <URL: http://www.andwinpcb.com/rigid-flex-pcb/>, 5 pages. Publicly available before Jun. 13, 2018.
EPO; App. No. 06018783.8; Extended European Search Report dated Nov. 5, 2012; 14 pages.
EPO; App. No. 10 170 920; Exam Report dated Dec. 19, 2012; 6 pages.
EPO; App. No. 10822643.2; Extended European Search Report dated Nov. 17, 2014.
EPO; App. No. EP 06018783; Supplementary Partial European Search Report dated Dec. 15, 2011; 7 pages.
EPO; App. No. EP 10170920.2; European Search Report dated Mar. 8, 2012; 7 pages.

(56) References Cited

OTHER PUBLICATIONS

EPO; App. No. EP09180196; Extended European Search Report dated Apr. 9, 2010; 7 pages.
European Patent Office, Extended European Search Report for European Application No. 17177629.7 dated Nov. 8, 2017, 8 pages.
Microchip Technology Inc.; PIC/16F631/677/685/687,689/690 Data Sheet; 20-Pin Flash-Based, 8-Bit CMOS Microcontrollers with Nano Watt Technology; 2006; 294 pages.
PCT; App. No. PCT/US2010/043273; International Search Report dated Mar. 2, 2011; 3 pages.
PCT; App. No. PCT/US2010/043273; Written Opinion of the International Searching Authority dated Mar. 2, 2011; 3 pages.
PCT; International Search Report corresponding to International Application No. PCT/US2007/068242; dated Jul. 28, 2008; 4 Pages.
PCT; International Search Report corresponding to International Application No. PCT/US2010/051699; dated Nov. 30, 2010; 2 Pages.
PCT; Written Opinion of the International Searching Authority corresponding to International Application No. PCT/US2010/051699; dated Nov. 30, 2010; 8 Pages.
Rain Bird Corporation IC System Design Guide v 2.3, updated Aug. 2016, 21 pages.
Rain Bird Corporation IC System Operation and Troubleshooting Guide, Jul. 2009, 27 pages.
Rain Bird Corporation, IC System Installation Guide, Jul. 2009, 19 pages.
Rain Bird, 'FD Field Decoders: Rain Bird Decoders', Feb. 17, 2005, pp. 1-4, printed from www.rainbird.com/golf/products/centralcontrol/decoders.htm, Rain Bird Corporation, Glendora, CA.
Rain Bird, 'Full/Part Circle Roters', Oct. 2004, pp. 1-4, Catalog No. 438, Rain Bird Corporation, Glendora, CA.
Rain Bird, 'Tech Specs: Rain Bird Decoders', Oct. 2004, Rain Bird Corporation Golf Division, Tucson, AZ; 2 pages.
Rain Bird, "Master Parts Book 2008-2009", Jan. 2008, pp. 129-130, 140, Rain Bird Corporation, Parts and Service Center, Azusa, CA.
Rain Bird, "Maxicom2 Decoders: Sensor-Pulse", Sep. 2002, pp. 1-2, Rain Bird Corporation, Azusa, CA.
Rain Bird, "Rain Bird Latching Solenoid: Part No. 231831", 1999, Rain Bird Corporation, Tucson, AZ, 1 page.
Rain Bird, "Rain Bird MDC Decoder-based Control System", Jan. 2006, pp. 1-4, Rain Bird Corporation, Azusa, CA.
Sierra Circuits, Flex & Rigid-Flex PCBs, [online]. Retrieved from the Internet: <URL: https://web.archive.org/web/20150919031553/https://www.protoexpress.com/flex-pcb>, 3 pages. Publicly available before Jun. 13, 2018.
Sierra Circuits, Flex PCBs: Design Guide, 26 pages. Publicly available before Jun. 13, 2018.
SIPO; App No 200911000193.6; Office Action dated Nov. 5, 2012; 23 pages.
SIPO; App. No. 201080037966.2; Office Action and partial summary translation provided by Chinese Associate dated Jan. 6, 2014; 6 pages.
SIPO; App. No. 201080037966.2; Office Action dated Sep. 3, 2014; 14 pages.
The Toro Company; "Golf Decoder Control System (GDC)"; http://web.archive.org/web/20070625035525/www.toro.com/irrigation/golf/lgturffield/gdc/index.html; Available at least as early as Jun. 25, 2007, pp. 66.
U.S. Appl. No. 16/992,962, filed Aug. 13, 2020, Michael James Tennyson et al., entitled Wireless Irrigation Control.
USPTO, U.S. Appl. No. 09/592,907, filed Jun. 13, 2000, entitled "Canister Purge Valve for High Regeneration Airflow," abandoned.
USPTO; U.S. Appl. No. 13/500,882 ; Office Action dated Dec. 18, 2014.
USPTO; U.S. Appl. No. 11/228,413; Examiner Interview Summary dated Apr. 22, 2009; 2 pages.
USPTO; U.S. Appl. No. 11/228,413; Examiner Interview Summary dated Dec. 7, 2009; 2 pages.
USPTO; U.S. Appl. No. 11/228,413; Notice of Allowance dated Jun. 18, 2010; 8 pages.
USPTO; U.S. Appl. No. 11/228,413; Notice of Panel Decision from Pre-Appeal Brief Review mailed Apr. 28, 2010; 2 pages.
USPTO; U.S. Appl. No. 11/228,413; Office Action dated Apr. 2, 2008; 12 pages.
USPTO; U.S. Appl. No. 11/228,413; Office Action dated May 20, 2009; 10 pages.
USPTO; U.S. Appl. No. 11/228,413; Office Action dated Dec. 2, 2008; 9 pages.
USPTO; U.S. Appl. No. 11/228,413; Office Action dated Dec. 7, 2009; 12 pages.
USPTO; U.S. Appl. No. 11/228,413; Supplemental Notice of Allowance dated Aug. 5, 2010; 4 pages.
USPTO; U.S. Appl. No. 11/228,413; Supplemental Notice of Allowance dated Sep. 2, 2010; 4 pages.
USPTO; U.S. Appl. No. 12/505,397; Office Action dated Feb. 13, 2013; 16 pages.
USPTO; U.S. Appl. No. 12/505,401; Notice of Allowance dated May 7, 2012; 5 pages.
USPTO; U.S. Appl. No. 12/505,401; Office Action dated Oct. 31, 2011; 14 pages.
USPTO; U.S. Appl. No. 12/510,111; Notice of Allowance dated Apr. 2, 2014; 12 pages.
USPTO; U.S. Appl. No. 12/510,111; Notice of Allowance dated May 16, 2014; 9 pages.
USPTO; U.S. Appl. No. 12/510,111; Office Action dated Jun. 4, 2013; 22 pages.
USPTO; U.S. Appl. No. 12/510,111; Office Action dated Oct. 16, 2012; 12 pages.
USPTO; U.S. Appl. No. 12/510,111; Office Action dated Dec. 27, 2013; 18 pages.
USPTO; U.S. Appl. No. 12/510,111; Office Action dated Feb. 29, 2012; 21 pages.
USPTO; U.S. Appl. No. 12/510,118; Notice of Allowance dated Apr. 2, 2014; 5 pages.
USPTO; U.S. Appl. No. 12/510,118; Notice of Allowance dated May 16, 2014; 9 pages.
USPTO; U.S. Appl. No. 12/510,118; Office Action dated Jun. 5, 2013; 20 pages.
USPTO; U.S. Appl. No. 12/510,118; Office Action dated Oct. 16, 2012; 15 pages.
USPTO; U.S. Appl. No. 12/510,118; Office Action dated Dec. 30, 2013; 17 pages.
USPTO; U.S. Appl. No. 12/510,118; Office Action dated Feb. 29, 2012; 21 pages.
USPTO; U.S. Appl. No. 12/866,471; Office Action dated Mar. 17, 2011; 18 pages.
USPTO; U.S. Appl. No. 12/886,471; Notice of Allowance dated Sep. 20, 2011; 7 pages.
USPTO; U.S. Appl. No. 12/886,471; Supplemental Notice of Allowance dated Oct. 19, 2011; 3 pages.
USPTO; U.S. Appl. No. 13/332,337; Notice of Allowance dated Mar. 13, 2014; 11 pages.
USPTO; U.S. Appl. No. 13/332,337; Notice of Allowance dated Dec. 6, 2013; 11 pages.
USPTO; U.S. Appl. No. 13/500,882; Notice of Allowance dated Oct. 5, 2015.
USPTO; U.S. Appl. No. 13/500,882; Office Action dated Apr. 3, 2015.
USPTO; U.S. Appl. No. 13/570,139; Notice of Allowance dated May 9, 2013; 15 pages.
USPTO; U.S. Appl. No. 13/570,139; Office Action dated Dec. 26, 2012; 8 pages.
USPTO; U.S. Appl. No. 13/963,966; Notice of Allowance dated Aug. 6, 2014; 7 pages.
USPTO; U.S. Appl. No. 13/963,966; Office Action dated Feb. 6, 2014; 16 pages.
USPTO; U.S. Appl. No. 14/304,502; Notice of Allowance dated Jan. 27, 2017; 8 pages.
USPTO; U.S. Appl. No. 14/304,502; Office Action dated Jul. 12, 2016; 12 pages.
USPTO; U.S. Appl. No. 14/493,106; Application filed Sep. 22, 2014, entitled "Integrated Control Circuitry and Coil Assembly for Irrigation Control," (57 pages).

(56) References Cited

OTHER PUBLICATIONS

USPTO; U.S. Appl. No. 14/493,106; Notice of Allowance dated Apr. 30, 2018.
USPTO; U.S. Appl. No. 14/493,106; Office Action dated Apr. 21, 2016; 14 pages.
USPTO; U.S. Appl. No. 14/493,106; Office Action dated Sep. 22, 2017.
USPTO; U.S. Appl. No. 14/493,106; Office Action dated Oct. 11, 2016; 9 pages.
USPTO; U.S. Appl. No. 14/507,751; Application filed Oct. 6, 2014, entitled "Integrated Control Circuitry and Coil Assembly for Irrigation Control," (57 pages).
USPTO; U.S. Appl. No. 14/507,751; Notice of Allowance dated Feb. 21, 2017; 8 pages.
USPTO; U.S. Appl. No. 14/507,751; Notice of Allowance dated Oct. 12, 2016; 6 pages.
USPTO; U.S. Appl. No. 14/507,751; Office Action dated Apr. 19, 2016; 14 pages.
USPTO; U.S. Appl. No. 14/989,771; Notice of Allowance dated Sep. 13, 2018.
USPTO; U.S. Appl. No. 14/989,771; Office Action dated Feb. 22, 2018.
USPTO; U.S. Appl. No. 15/380,816; Notice of Allowance dated May 18, 2018.
USPTO; U.S. Appl. No. 15/380,816; Office Action dated Dec. 5, 2017.
USPTO; U.S. Appl. No. 15/499,620; Notice of Allowance dated Apr. 9, 2019; 7 pages.
USPTO; U.S. Appl. No. 15/499,620; Office Action dated Dec. 13, 2018; 7 pages.
USPTO; U.S. Appl. No. 15/616,736; Application filed Jun. 7, 2017, entitled "Methods and Systems for Irrigation and Climate Control," (77 pages).
USPTO; U.S. Appl. No. 15/616,736; Office Action dated Feb. 20, 2020; (pp. 1-15).
USPTO; U.S. Appl. No. 15/631,191; Notice of Allowance dated Jul. 16, 2020, (pp. 1-8).
USPTO; U.S. Appl. No. 15/631,191; Notice of Allowance dated Oct. 27, 2020; (pp. 1-7).
USPTO; U.S. Appl. No. 15/631,191; Office Action dated Jan. 29, 2020; (pp. 1-9).
USPTO; U.S. Appl. No. 15/631,191; Office Action dated May 7, 2020, (pp. 1-10).
USPTO; U.S. Appl. No. 15/631,191; Office Action dated Jun. 11, 2020, (pp. 1-8).
USPTO; U.S. Appl. No. 15/631,191; Office Action dated Oct. 22, 2019; (pp. 1-13).
USPTO; U.S. Appl. No. 15/937,267; Office Action dated Jul. 6, 2020, (pp. 1-18).
USPTO; U.S. Appl. No. 15/937,267; Office Action dated Nov. 1, 2019; (pp. 1-17).
USPTO; U.S. Appl. No. 16/049,568; Office Action dated Jan. 13, 2020; (pp. 1-15).
USPTO; U.S. Appl. No. 16/052,471; Office Action dated Jan. 13, 2020; (pp. 1-15).
USPTO; U.S. Appl. No. 16/452,397; Notice of Allowance dated Mar. 11, 2020; (pp. 1-9).
USTPO; U.S. Appl. No. 14/493,106; Office Action dated Apr. 11, 2017; 11 pages.
Williamson; U.S. Appl. No. 60/797,540, filed May 4, 2006; 13 Pages.
U.S. Appl. No. 13/844,248, filed Mar. 15, 2013, Ersavas.
U.S. Appl. No. 13/844,304 filed Mar. 15, 2013, Ersavas.
'PureSense on-line help', https://www.pserm.com/IrrigationManagerHelp/PureSense_Irrigation_Manager.htm, Mar. 24, 2010.
Akyildiz et al., "Wireless sensor networks: a survey," Computer Networks 38 (2002) 393-422.
Intel, "Instrumenting the World: An Introduction to Wireless Sensor Networks," Version 1, Feb. 2004.
Li, "Study on Precision Agriculture Monitoring Framework Based on WSN," Anti-counterfeiting, Security, and Identification, 2nd International Conference, 2008, 182-185.
Nokia, "Machine-to-Machine," White Paper (2004).
PCT; App. No. PCT/TR2009/000103; International Report on Patentability dated Feb. 24, 2011.
PCT; App. No. PCT/TR2009/000103; International Search Report dated Feb. 1, 2010.
PCT; App. No. PCT/TR2009/000103; Written Opinion dated Feb. 12, 2011.
USPTO; U.S. Appl. No. 13/532,557; Notice of Allowance dated Apr. 4, 2017.
USPTO; U.S. Appl. No. 13/532,557; Notice of Allowance dated Jul. 31, 2017; (pp. 1-8).
USPTO; U.S. Appl. No. 13/532,557; Office Action dated Sep. 9, 2016.
USPTO; U.S. Appl. No. 13/532,557; Office Action dated Oct. 15, 2015.
USPTO; U.S. Appl. No. 13/844,304; Notice of Allowance dated Mar. 6, 2017.
USPTO; U.S. Appl. No. 13/844,304; Office Action dated Oct. 3, 2016.
USPTO; U.S. Appl. No. 13/844,304; Office Action dated Oct. 16, 2015.
USPTO; U.S. Appl. No. 14/466,469; Notice of Allowance dated Sep. 11, 2015.
USPTO; U.S. Appl. No. 14/970,349; Office Action dated Feb. 8, 2018; (pp. 1-10).
USPTO; U.S. Appl. No. 12/537,772; Office Action dated Mar. 21, 2013.
USPTO; U.S. Appl. No. 12/537,772; Office Action dated Dec. 29, 2011.
USPTO; U.S. Appl. No. 12/849,488; Notice of Allowance dated Feb. 22, 2013.
USPTO; U.S. Appl. No. 12/849,488; Notice of Allowance dated Jul. 3, 2013.
USPTO; U.S. Appl. No. 12/849,488; Notice of Allowance dated Oct. 28, 2013.
USPTO; U.S. Appl. No. 12/849,488; Office Action dated Jun. 22, 2012.
USPTO; U.S. Appl. No. 13/151,269; Office Action dated Jan. 18, 2012.
USPTO; U.S. Appl. No. 13/532,557; Office Action dated Jan. 2, 2015.
USPTO; U.S. Appl. No. 13/844,248; Notice of Allowance dated May 22, 2014, 2014.
USPTO; U.S. Appl. No. 13/844,304; Office Action dated Dec. 30, 2014.
USPTO; U.S. Appl. No. 14/466,469; Office Action dated Dec. 29, 2014.
USPTO; U.S. Appl. No. 14/970,349; Notice of Allowance dated Mar. 25, 2019; (pp. 1-10).
USPTO; U.S. Appl. No. 14/970,349; Notice of Allowance dated Oct. 2, 2018 (pp. 1-9).
USPTO; U.S. Appl. No. 15/616,736; Office Action dated May 29, 2019 (pp. 1-16).
Zigbee, 'Zigbee Resource Guide—Spring 2008,' 2008, pp. 28-31, Fourier Systems Ltd., New Albany, IN.
Zigbee; 'Zigbee Resource Guide—Spring 2008;' 2008; pp. 1-32; Fourier Systems Ltd.; New Albany, IN.
U.S. Appl. No. 14/493,106, filed Sep. 22, 2014, Timothy J. Crist.
U.S. Appl. No. 14/507,751, filed Oct. 6, 2014, Timothy J. Crist.
EPO; App. No. EP09180196; Search Report dated Sep. 4, 2010; 6 Pages.
USPTO; U.S. Appl. No. 15/616,736; Office Action dated Feb. 1, 2021.
USPTO; U.S. Appl. No. 16/007,007; Notice of Allowance dated Feb. 22, 2021; (pp. 1-7).
USPTO; U.S. Appl. No. 16/506,742; Office Action dated Mar. 9, 2021; (pp. 1-15).

(56) References Cited

OTHER PUBLICATIONS

USPTO; U.S. Appl. No. 16/933,594; Notice of Allowance dated Mar. 17, 2021.

* cited by examiner

FIG. 10
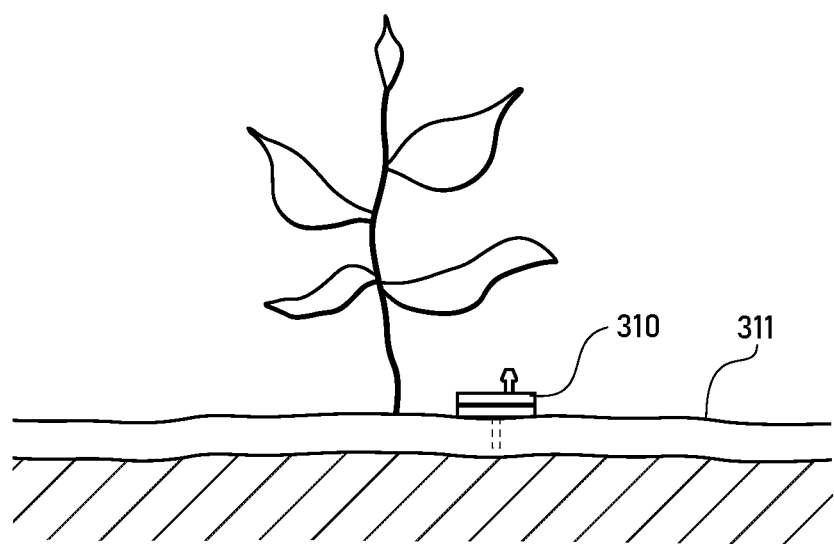
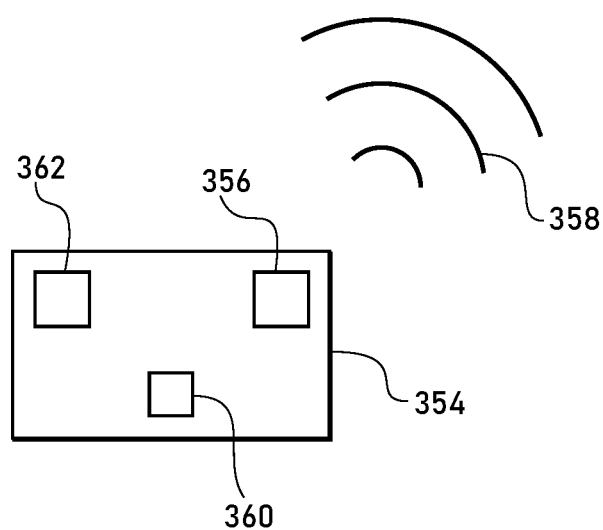

SMART DRIP IRRIGATION EMITTER

CROSS REFERENCE TO RELATED APPLICATION

This application claims the benefit of U.S. Provisional Application No. 62/655,890, filed Apr. 11, 2018, which is hereby incorporated herein by reference in its entirety.

FIELD

The subject matter of this application relates to drip emitters of irrigation systems and, more particularly, to a smart drip irrigation emitter to provide intelligent features including on-demand watering, communication links and sensors.

BACKGROUND

Drip irrigation emitters are generally used to deliver water to a precise point at a predetermined and relatively low volume flow rate. Such emitters are commonly attached to a water supply tube through which irrigation water is supplied under pressure. For instance, many emitters may be mounted at selected positions along the length of the supply tube to deliver the irrigation water to many specific points, such as directly to a plurality of individual plants.

While emitters typically can be used to conserve water, there is still the potential to water vegetation that does not need water because when the supply tube is pressurized all the emitters in the line discharge water. Thus, there is a desire to have only the emitters provide water when associated with vegetation in need of water. Even though this desire applies to all regions, there is a special interest toward regions of warmer climates. Warmer climate regions tend to have more water conservation needs and restrictions, leading to being able to use limited fresh water supplies even more efficiently and effectively. The conservation of water is growing with the increasing demand for locally sourced fruits and vegetables for their nutritive value, fresh taste, and small carbon footprint.

Therefore, it is desired to have an irrigation system that controls the flow of water from the emitters to individual plants based on the plant's need so that each plant receives only the necessary amount of water. This eliminates water waste associated with watering plants that do not require water.

BRIEF DESCRIPTION OF THE DRAWINGS

FIG. 10 is a schematic diagram of a wireless irrigation system with the drip emitter of FIG. 8;

DETAILED DESCRIPTION

Figure 1:
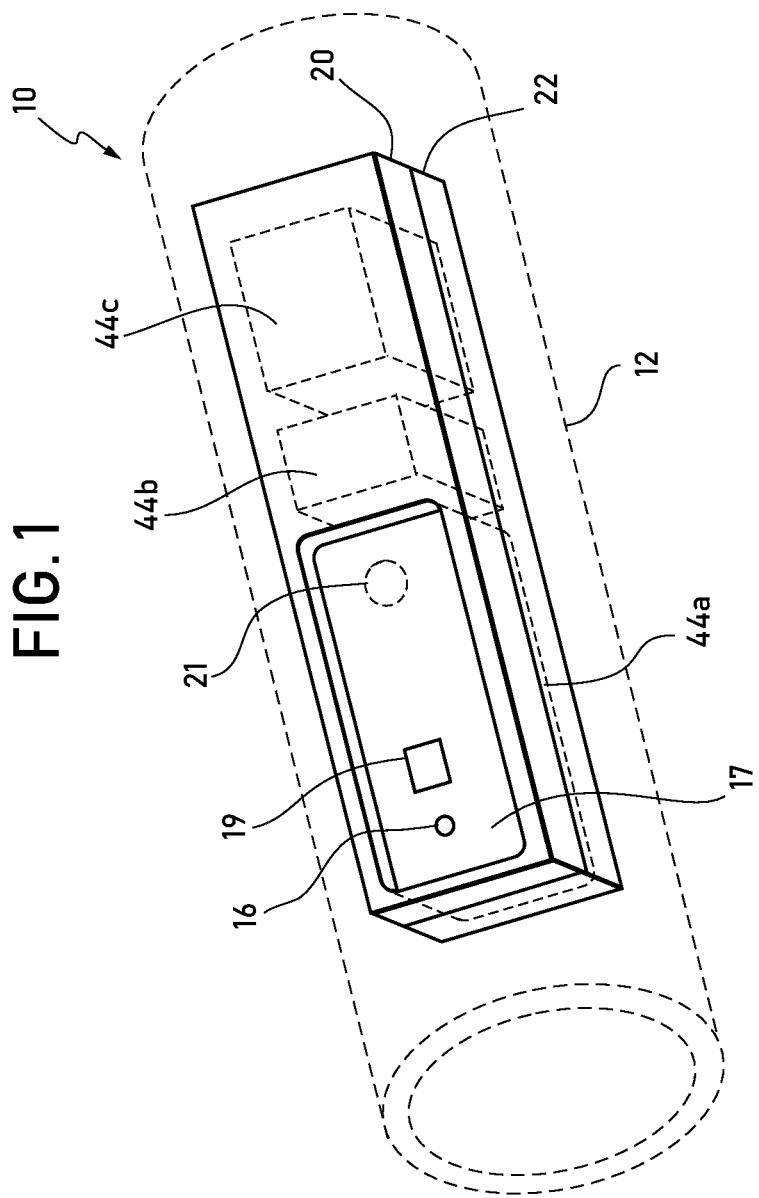
FIG. 1 is a top perspective view of a drip emitter embedded in a conduit.
Figure 2:
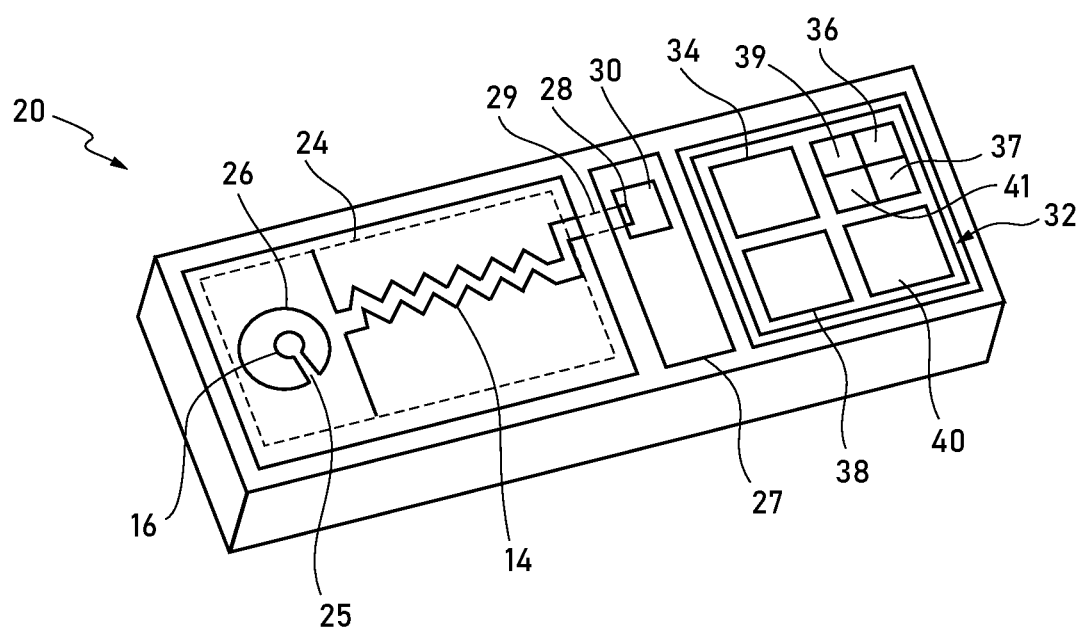
FIG. 2 is a top perspective view of a first member of the drip emitter of FIG. 1.
Figure 3:
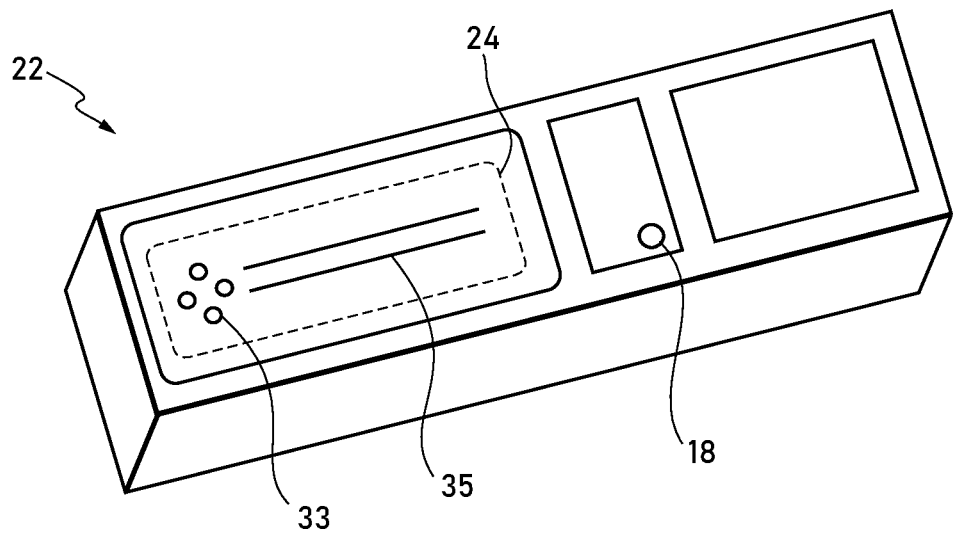
FIG. 3 is a top perspective view of a second member of the drip emitter of FIG. 1.

Referring to FIGS. 1-3, a smart drip emitter 10 is provided for delivering irrigation water from a water supply line conduit 12, such as an irrigation supply tube, at a low volume flow rate. The emitter 10 operates generally using a pressure reduction flow path in the form of a tortuous path flow channel 14 between the supply tube 12 and an emitter outlet 16. The emitter 10 has an inlet 18 for receiving water flow from the supply tube 12.

The emitter 10 is a multi-piece emitter with a first member 20, a second member 22, and a diaphragm 24. As explained later, the emitter can also be a one-piece emitter. The second member 22 includes an inlet 33 leading to a pressure chamber 35, and the inlet 18. The first member 20 defines the tortuous path 14 and includes a metering table 26 with a groove 25, an inlet bath 27, a valve 28, a valve port 29, a solenoid 30, and the outlet 16. As water pressure in the pressure chamber 35 increases, the diaphragm is deflected into the tortuous path 14 and/or toward the metering table 26. This provides for pressure compensation as the pressure in the supply tube 12 rises and falls, as explained further herein. The outlet 16 leads to an outlet bath 17 on the opposite side of the first member 20. The outlet bath 17 has a copper chip 19 for root intrusion protection.

The first member 20 also has a printed circuit board 32. The printed circuit board 32 has micro-electronics, including, for example, a power source 34, a processor 36, memory 37, a capacitor 38, an encoder 39, a decoder 40, and/or a transceiver 41. In the preferred embodiment, the power source 34 is a near-field power receiver, such as a power receiver used for radio frequency identification (RFID). Examples include EGGTRONIC®, Cota®, Powercast®, and Airfuel RF®. More specifically, in response to receiving a wireless power signal, the wireless power source 34 can power the processor 36, the transceiver 41, and other micro-electronics, such as those described herein. The wireless power source 34 also provides energy to charge the capacitor 38. Additionally, the transceiver 41 may be a wireless transceiver configured to receive and transmit data in the form of a wireless signal, such as a WiFi signal or any other wireless communication technology including Bluetooth®, Zigbee®, Z-Wave®, and Insteon®.

The second member 22 and the first member 20 may be formed from assembled plastic molded housing components. The second member 22 is adapted for assembly with the first member 20 to form an enclosed housing consisting of three compartments 44a,b,c. More specifically, the first compartment 44a encloses the diaphragm 24, the second compartment 44b encloses the valve 28 and its operator, such as solenoid 30, and the third compartment 44c encloses the micro-electronics, such as the printed circuit board 32. The opposite side of the second member 22 is adapted for mounting to the inner surface of the supply tube 12. As mentioned above, the outlet 16 leads to the outlet bath 17 formed between the inner surface of the supply tube 12 and the first member 20. The supply tube 12 includes a hole 21 over the outlet bath 17 so that water drips can be discharged from the water supply tube 12.

In operation, the solenoid 30 is in communication with the processor 36 to open and close the valve 28. When the valve 28 is open, water flows to and through the tortuous path 14 and then to the metering table 26. The diaphragm 24 is exposed to the water pressure in the supply tube 12 via the inlet 33. The diaphragm 24 seats on the pressure chamber 35 for pressure compensation to regulate water through the outlet 16 and/or the tortuous path 14. For example, the pressure chamber 35 can cause the diaphragm 24 to move into the tortuous path 14. Further, the diaphragm 24 can move toward the metering table 26 when pressure increases and even engage the metering table 26 in high pressure situations where the water would flow through only the metering groove 25. The water then exits through the outlet 16 to the outlet bath 17 where it is emitted through the hole 21 in the supply tube 12 for discharge to a desired location. In the preferred embodiment, the solenoid 30 is a wireless, latching type solenoid to reduce power consumption. Other solenoid types are possible and contemplated, including non-latching solenoids.

Figure 4:
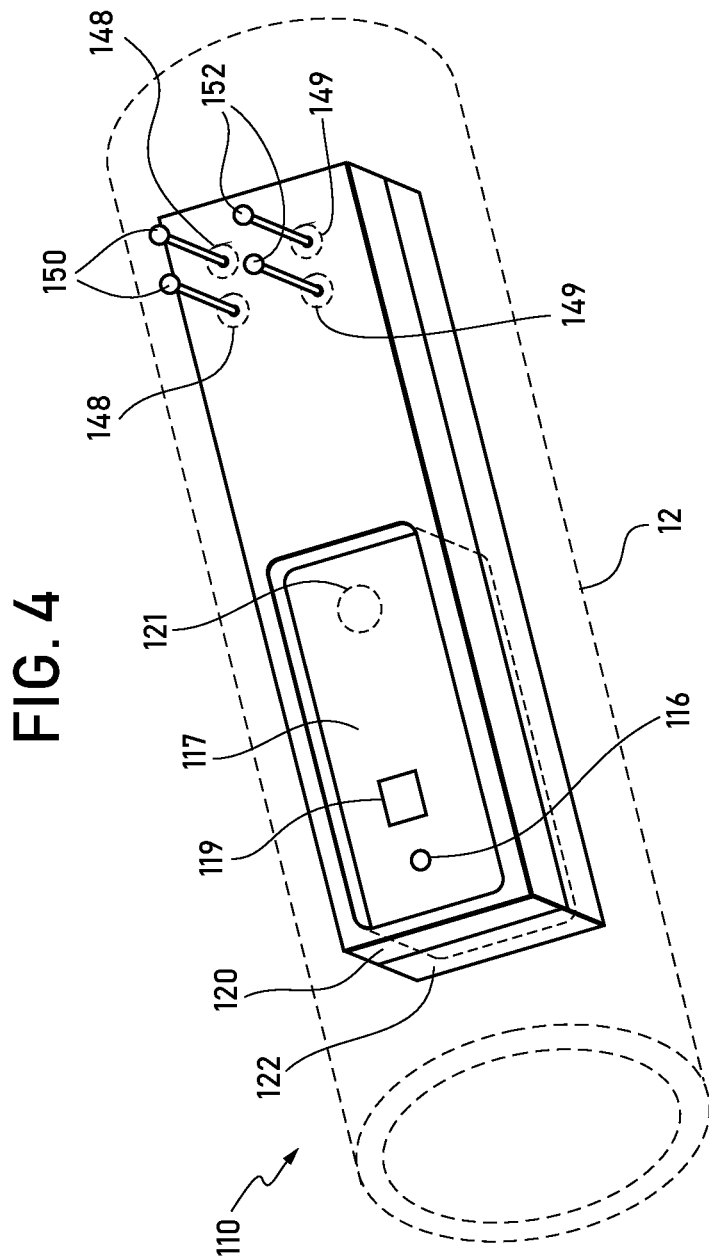
FIG. 4 is a top perspective view of an alternative drip emitter embedded in a conduit.
Figure 5:
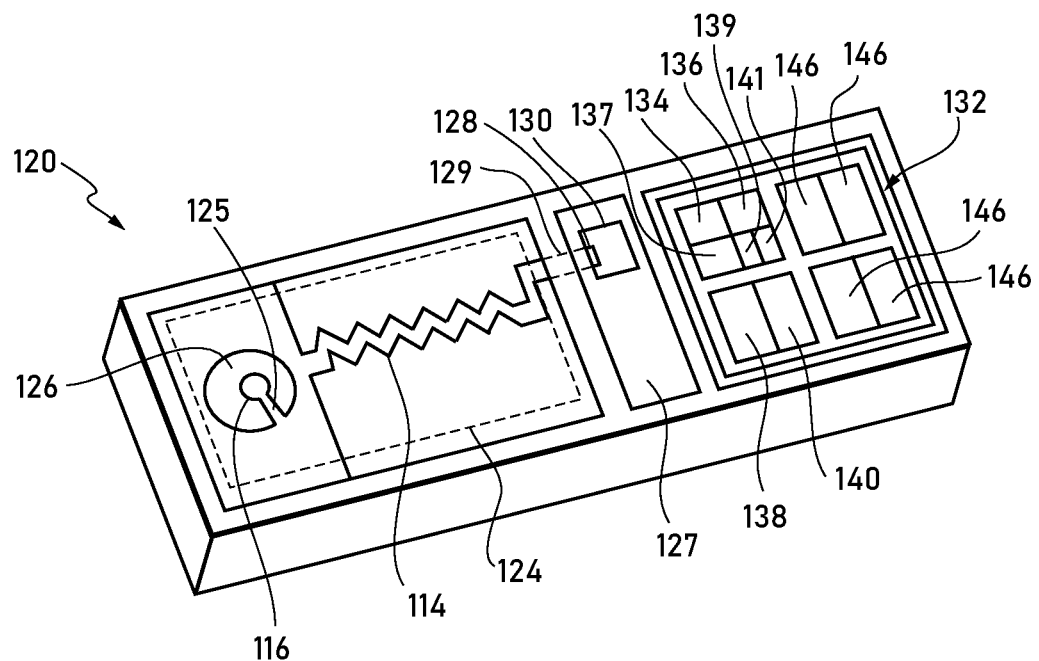
FIG. 5 is a top perspective view of a first member of the drip emitter of FIG. 4.

With reference to FIGS. 4 and 5, an alternative emitter 110 is shown with alternative first and second emitter members 120,122, respectively. Many of the components described above for the members 20,22 of FIGS. 1-3 are the same for the first and second members 120,122 of FIGS. 4 and 5 but include a "1" preceding the reference number.

A printed circuit board 132 associated with the first member 120 may include a wireless power source 134, a processor 136, memory 137, a capacitor 138, an encoder 139, a decoder 140, and/or a transceiver 141. The printed circuit board 132 may also include sensors 146. The sensors 146 may be exposed to the surrounding environment via holes 148 through both the first member 120 and the wall of the supply tube 12. The sensors 146 may detect conditions relating to the local micro-climate for an individual plant within a larger system of plants (e.g., a tomato plant in a tomato farm, a grape tree in a vineyard, etc.). For example, a sensor may detect the humidity of the air surrounding the plant with a wireless water vapor sensor. Another sensor may detect the temperature of the air surrounding the plant with a Bluetooth temperature sensor. A third sensor may detect the moisture in the soil that the plant lives in by measuring the soil pressure, the electrical resistance, the dielectric constant or interactions with neutrons. A fourth sensor may detect the ground pressure with a wireless acoustic sensor. Additionally, the printed circuit board 132 may have sensors to detect information pertaining to the plant itself. For example, gas/volatilized compounds emitted from the plant may be detected and analyzed with wireless chemical recognition biosensors to detect plant health. Additionally, light emission sensors may be configured to be chip-sized spectrometers. Innumerable permutations of possible sensors and sensor combinations are possible and contemplated.

In one example, a plurality of sensors is configured to be probes 150 for collecting data. The probes 150 may be attached to the printed circuit board 132. The probes 150 may extend up and through holes 148 of the first member 120 and into the soil. For an in-line emitter, the probes 150 would also have to extend through holes 149 of the water supply tube 12. The probes 150 detect information about the ambient environment or about the soil such as the moisture and ground pressure, as well as information about the plant itself, such as gas emission from the roots of the plant to determine overall plant health. While two probes 150 are shown, the emitter 110 may be configured to have any number of probe-based sensors. The probes also could be positioned remote of the emitter and communicate wirelessly with the emitter.

In another example, a plurality of sensors is configured with antennae 152 for collecting data. In a similar manner to the probes 150, the antennae 152 may be attached to the printed circuit board 132. The antennae 152 may extend up and through the holes 148 of the first member 120 and into the ambient or soil environment around the plant. For an in-line emitter, the antennae 152 would also have to extend through the holes 149 of the water supply tube 12. The antennae 152 detect information about the micro-climate around the plant, such as air temperature and humidity. Antennae 152 may also be configured to capture a wireless signal used to activate the wireless power source 134. In one example, the antennae 152 may be passive sensors, such as radio-frequency identification (RFID) devices. An antenna may be used to activate and/or communicate with a sensor remote from the emitter. While two antennae 152 are shown, the emitter 110 may be configured to have any number of antennae. Furthermore, the emitter 110 may have any number and combination of probes 150 and antennae 152.

Figure 6:
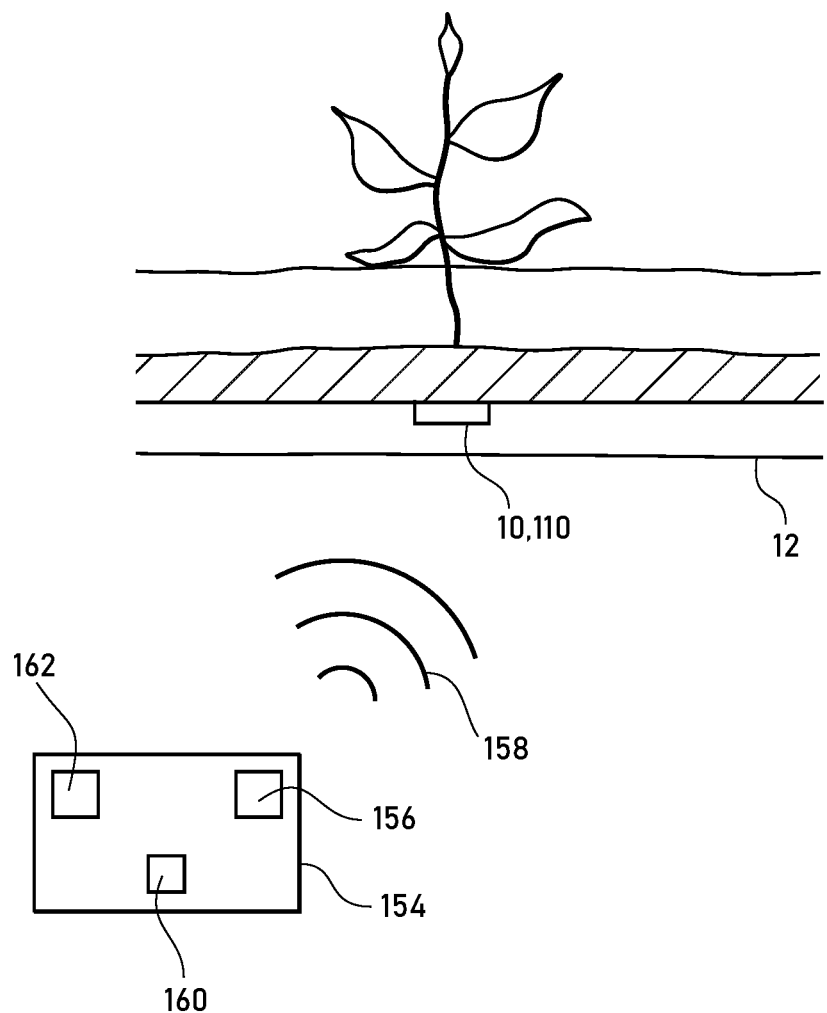
FIG. 6 is a schematic diagram of a wireless irrigation system.

With reference to FIG. 6, the emitter 10 or emitter 110 is shown embedded in the supply tube 12 to monitor a plant. The following discussion regarding FIG. 6 applies to both emitter 10 and emitter 110 but will be discussed with reference to only emitter 110. The supply tube 12 and emitter 110 may be located on the surface or, as illustrated, beneath the surface. A controller 154 or other computing device in communication with the emitter 110 is typically at the location of the irrigation system. The controller 154 includes schedules that turn on and off the valves of the supply tube 12 for controlling irrigation. The controller 154 may be configured to be controlled remotely via a mobile device (e.g., a smartphone or tablet) or a central control system. It also may include a gateway to communicate with the remote mobile device or the central control system. The gateway may be in communication with a cellular network. Further, the system may be controlled remotely without the need for a local controller. The intelligence provided by the controller could be provided at the valve, the emitters themselves, or some other device, such as the wireless signal generator 158 described below.

The controller 154 controls when a valve opens to pressurize the supply tube 12 with water and closes after a period based on a schedule. The controller 154 also can adjust schedules and override schedules based on sensor readings, weather conditions, and/or other variables. For example, the controller 154 may open an upstream valve to fill the supply tube 12 with water for irrigation for a certain amount of time, such as every other 6-hour period or some other watering schedule timeframe. In another embodiment, the controller 154 could operate to constantly maintain the supply tube 12 at full water pressure, and the valve is closed only to shut down the system for service or seasonal reasons. In either case, at some time interval, a wireless signal generator 158 associated with the controller 154 or as a standalone device emits the wireless signal 158. The wireless signal 158 may be an intermittent wireless pulse and is transmitted to activate the wireless power source 134 of the emitter 110. The emitter 110 operates at low power; thus, it does not require a continuous wireless signal, which may unnecessarily waste energy and diminish the stored power in the capacitor 138. Alternatively, the controller 154 may supply water when receiving feedback from the emitter 110 after a wireless activation is sent that the emitter 110 needs to water its vegetation. This example is discussed further with reference to FIG. 11.

Now that the wireless power source 154 is activated, the smart emitter 110 can decide whether to open a valve 128 (FIG. 5) and emit water based upon the data obtained by the sensors 146. For example, if the moisture sensor senses that the soil is drier than the preferred level, then a solenoid 130 will open the valve 128 to emit the precise amount of water so that the soil reaches the preferred soil moisture level. When the necessary amount of water has been emitted, the solenoid 130 will close the valve 128 and the emitter 110 may power down and conserve energy. This may be determined by calculating the amount of water to bring the water level up to the desired point, or the sensor 146 can be used to determine the shut off point.

Additionally, when the emitter 110 is powered, it can provide data back to the controller 154. For example, the processor 136 may process and collect data received by sensors 146 of the emitter 110. The processor 136 also can collect data regarding the emitter's 110 water usage. This data can be stored in the memory 137. This data can then be sent by the wireless transceiver 141 to the controller 154. The data may be sent in the form of a wireless WiFi signal. The controller 154 may have a data logger 160 to log the data or other memory capacity. Still further, the controller 154 may have a processor 162 to process the data and make decisions based on the data. For example, the wireless transceiver 141 may send data to the controller 154 about the health of its associated plant. Based on that information, the processor 162 may alert a user that the plant may be dying or potentially have a disease and should be removed. This alert can be displayed on the controller 154 or sent to another device, such as a central command computer or mobile device.

Figure 7:
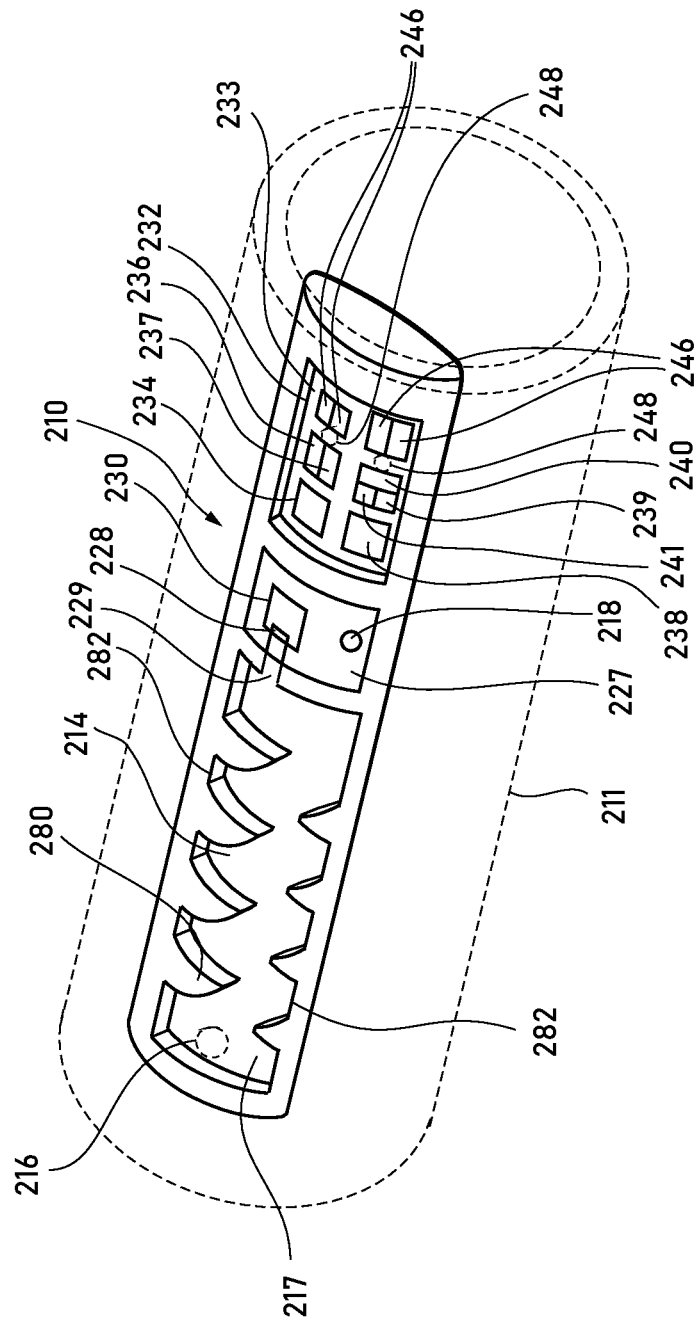
FIG. 7 is a top perspective view of an alternative drip emitter embedded in a conduit.

With reference to FIG. 7, an alternative smart drip emitter is configured to be a wireless, single-piece, in-line emitter 210 that is mounted to the inside of a supply tube 211. The emitter 210 may be made of elastomeric material, such as thermoplastic or thermosetting elastomeric material using ethylene, propylene, styrene, PVC, nitrile, natural rubber, or silicone, to form a polymer or copolymer. In a preferred embodiment, the elastomeric material is made of thermoplastic polyolefin (TPO) and silicone rubber.

The supply tube 211 is formed with an outlet 216 over an outlet bath 217 of the emitter 210 during manufacturing. The emitter 210 includes a baffle design with teeth 280 extending from opposing sides 282 of a pressure reduction path 214. The teeth 280 extend toward one another to form a tortuous path flow channel 214. The height of each tooth 280 may be higher at their base than at the terminal end of each tooth 280. The tapered teeth 280 provide pressure reduction. That is, as pressure increases in the supply tube 211, the elastomeric emitter body is moved toward the tube wall causing more of each tooth 280 to be engaged with the tube wall. This creates a longer tortuous path 214.

The emitter 210 further includes an inlet 218, an inlet bath 227, a valve 228, a valve port 229, a solenoid 230, and a printed circuit board 232. Many of the components described above for the micro-electronics may be the same for this embodiment but include a "2" preceding the reference number.

The printed circuit board 232 may include a wireless power source 234, a processor 236, memory 237, a capacitor 238, an encoder 239, a decoder 240, and a transceiver 241. The printed circuit board 232 also may have sensors 246 like those described above. The sensors 246 may be exposed to the surrounding environment via holes 248 extending through the tube wall. A bond between the top of the emitter 210 to the inside wall of the supply tube 211 forms a waterproof seal to protect the micro-electronics (i.e., solenoid 230 and the printed circuit board 232 and its circuitry) from water damage. More specifically, the rim around the printed circuit board is sealed to the inside wall of the tube 211. This compartment also may be potted with material that further protects the micro-electronics from exposure to water from the supply tube 211. The emitter embodiments above also may have their electrical components and printed circuit boards potted with material that further protects the electronics from water exposure. The sensors 146 may detect conditions relating to the local micro-climate for an individual plant within a larger system of plants and/or the conditions of the plants as described above. It may also communicate data as also described above.

Figure 8:
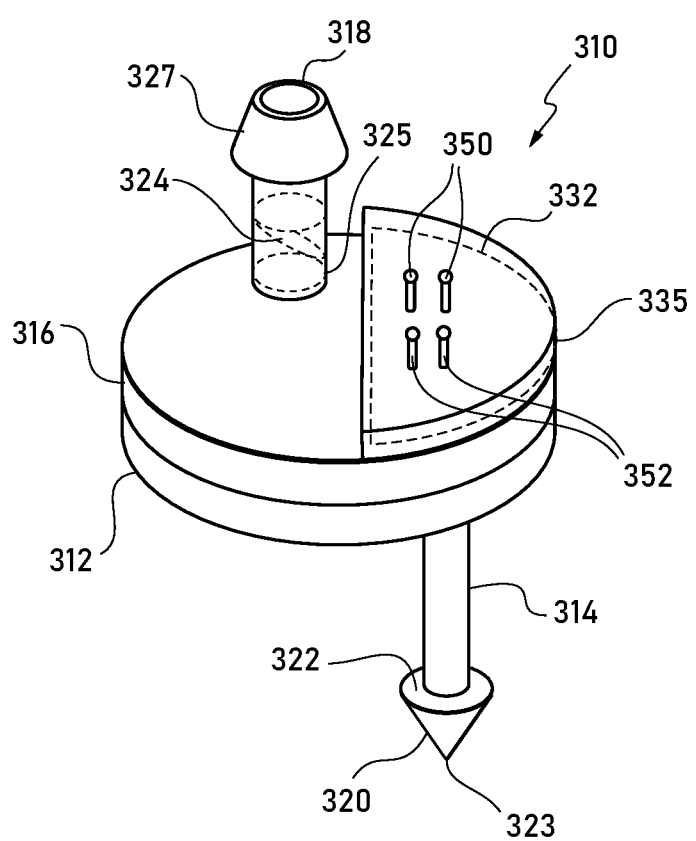
FIG. 8 is a top perspective view of another drip emitter.
Figure 9:
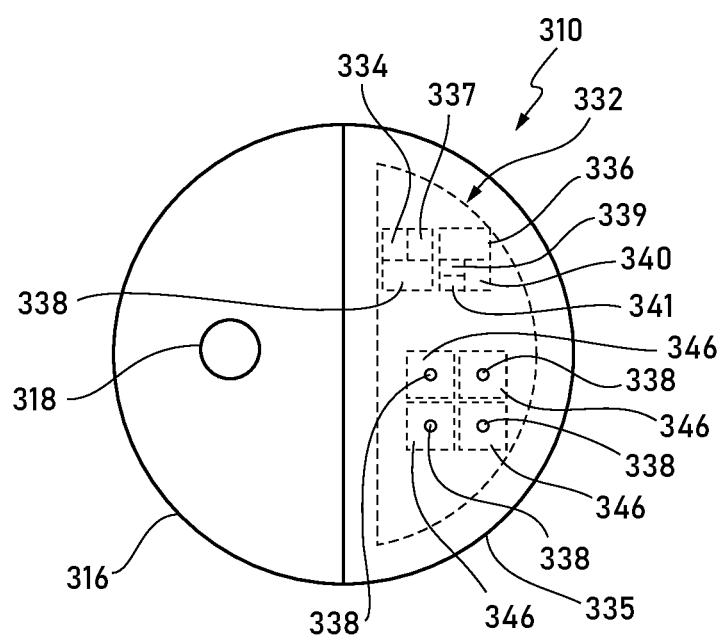
FIG. 9 is a plan view of the drip emitter of FIG. 8.

With reference to FIGS. 8-10, an alternative smart drip emitter is configured to be an on-line emitter 310 that can be attached to a supply tube 311 above ground. On-line drip emitters 310 may be attached at selected positions along the length of the supply tube 311 to deliver irrigation water to many specific points, including directly to a plurality of individual plants. The on-line drip emitter 310 can be mounted to the outside of the supply tube 311 to deliver irrigation water at a low volume flow rate.

The on-line drip emitter 310 includes a cover 312 with an inlet tube 314 and a body 316 with an outlet tube 318. The inlet tube 314 may terminate with a barb 320 to hold the emitter 310 fast to the supply line 311. The inlet tube 310 also may terminate with a pointed tip 323 to puncture the supply tube 311 for press-on puncture type attachment to the supply tube 311. In some cases, the supply tube 311 has been pre-punctured with a pilot hole using a puncture tool. The barb 320 includes a step 322 that prohibits the barb 320 from releasing from the supply tube 311. The tube wall around the puncture seals against the inlet tube 314.

The cover 312 is cylindrical (or disc-shaped) and can be press-fit into the body 316. The body 316 and cover 312 can be secured together such as by welding or use of an adhesive. The body 316 and cover 312 can be plastic molded components.

The outlet tube 318 extends from the body 316 and can be off-axis. The outlet tube 318 is associated with a valve 325 controlled by a solenoid 324 embedded therein. In the preferred embodiment, the solenoid 324 is a latching type solenoid to reduce power consumption. Other solenoid types, including non-latching, are possible and contemplated. A tube can also be attached to the outlet tube 318 and secured to it using a barb 327 to further direct water to a desired location.

The emitter 310 may have a printed circuit board 332 with the same micro-electronics as the in-line emitters described above, including, for example, a wireless power source 334, a processor 336, memory 337, a capacitor 338, an encoder 339, a decoder 340, a transceiver 341, and/or a plurality of sensors 346. Like the in-line wireless drip emitter 110 described above, the sensors 346 may be exposed to the surrounding environment via holes 338 formed in the body 316 and may further include probes 350 and antennae 352 extending therethrough. The sensors 346 also may be remote of the emitter 310 and wirelessly communicate with the emitter 310.

In the preferred embodiment, the printed circuit board 332 has a housing 335 affixed to the body 316. The housing 335 may be secured to the body 316 by welding or use of an adhesive. To fit onto the body 316 and avoid the off-axis outlet tube 318, the housing 335 and printed circuit board 332 may be semicircular in shape. Any other housing and printed circuit board configurations are possible, such as a dumbbell-shaped, folded printed circuit board. Further details regarding a dumbbell-shaped folded printed circuit board are contained in U.S. patent application Ser. No. 15/937,267, filed on Mar. 27, 2018, and U.S. Provisional Application No. 62/519,985, filed on Jun. 15, 2017, which both applications are incorporated by reference herein in their entirety. Still further, the printed circuit board 332 may contain flexible material (such as a flexible ribbon cable) to allow the printed circuit board 332 to wrap around the body 316.

Like the example of FIG. 6, the emitter 310 can provide data back to a controller 354 or other device, including a processor 362, data logger 360 or other memory device. More specifically, the processor 336 may process the data received by sensors 346 of the emitter 310. The data may then be sent in the form of a WiFi signal by the wireless transceiver 341 to the controller 354 or other data handling device. The data logger 360 may then log the data. Still further, the processor 362 may process the data and make decisions based on the data. For example, the data may indicate that the soil is dry, and the emitter needs to water its plant. Therefore, a wireless signal generator 356 may generate a wireless pulse 358 that activates the smart emitter 310. The emitter 310 can then open its valve 328 and emit water.

Figure 11:
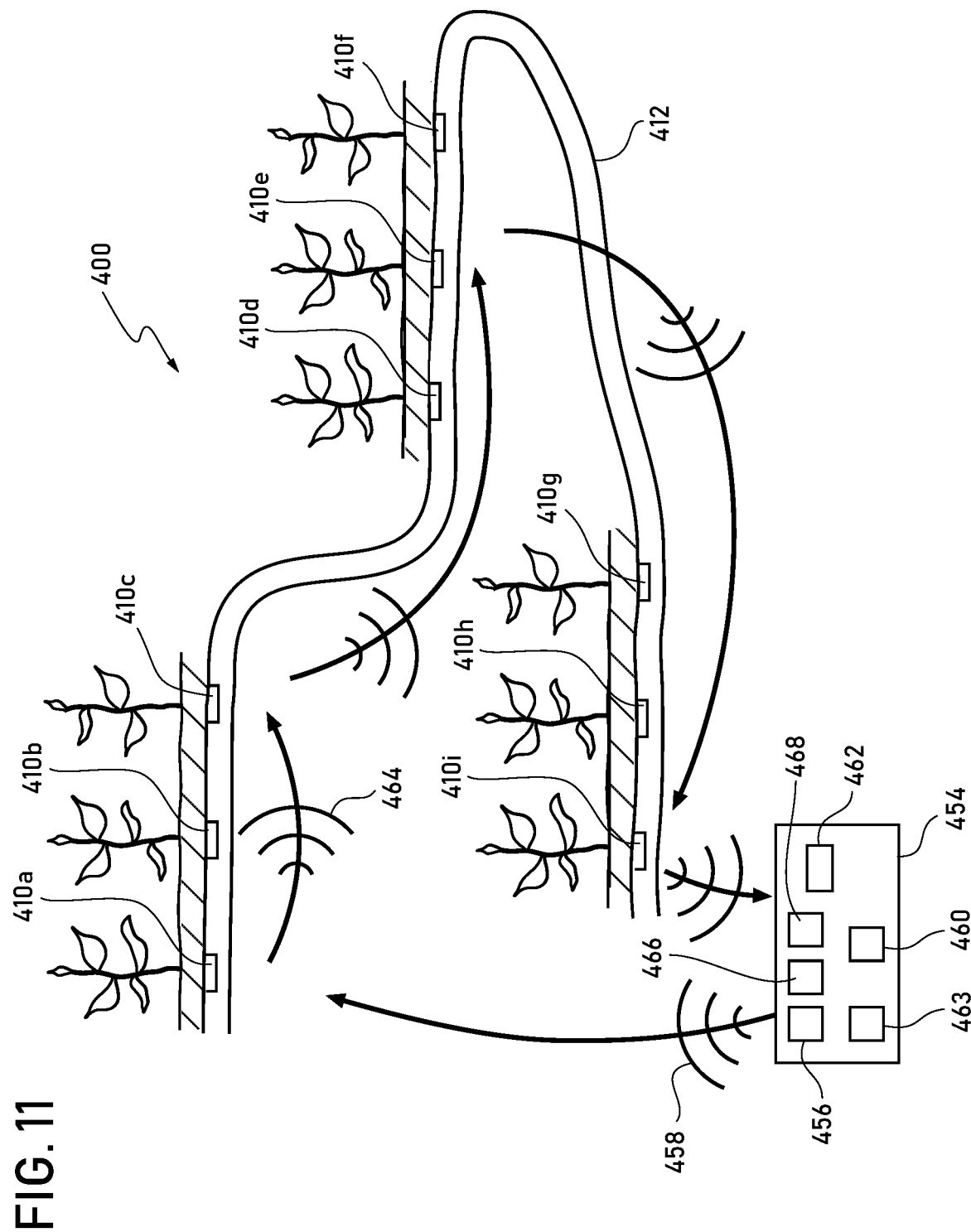
FIG. 11 is a schematic diagram of an irrigation system with a wireless drip emitter mesh network.

FIG. 11 is an irrigation system illustrating how data may be relayed from emitter-to-emitter and to a controller. More specifically, the irrigation system is configured with a wireless drip emitter mesh network 400. The wireless drip emitter mesh network 400 provides wireless communication between emitters 410 (410a-i) and a controller 454. For example, data communicated between transceivers of emitters 410a-i can be sent to a target transceiver 463 associated with the controller 454.

The wireless drip emitter mesh network 400 can determine the route by which data is communicated back to the controller 454. For example, if a desired communication path would go through an emitter 410 that is busy, the data will be sent a different route even though it may be less direct. Further, if an emitter 410 is offline or defective for some reason, the wireless drip emitter mesh network 400 will self-heal by providing an alternate route around the offline or defective emitter 410.

Additionally, the emitters 410 operate at low power, and a signal sent from the emitter may not be strong enough to reach the controller 454 directly. Therefore, the wireless drip emitter mesh network 400 will intelligently transmit the information in an energy-efficient manner. For example, the signal may "hop" from one emitter to another. More specifically, the nine emitters 410a-i of the wireless mesh network 400 are in series along a supply tube 412. Emitter 410a attempts to transmit a WiFi signal 464 to the controller 454. The emitter 410a does not have enough power to transmit the signal 464 over long distances, so it is broadcasted to nearby emitters. In this example, emitter 410b is already performing a function (or it does not have enough energy stored in its capacitor to receive and send the signal) so the signal 464 by-passes emitter 410b and wakes up an idle emitter 410c. Emitter 410c collects the data and transmits the data to the next emitter down the supply tube 412. Emitters 410d, 410f, 410g and 410h in this example are also occupied and/or too low on power, so the signal hops from emitter 410e to emitter 410i. Emitter 410i is close to the controller 454 and relays the signal 464 directly to the controller 454. In turn, a data logger 460 may log the data and a processor 462 processes and analyzes the data. In this manner, the emitters 410 can passively collect electromagnetic energy to briefly turn on, collect data, and transmit data amongst each other. This data in turn can be transmitted back to the controller 454 through the wireless mesh drip emitter network 400. It is also possible that the data does not make it back to the controller 454 because none of the emitters 410a-i have sufficient power to transmit, so the data remains with one of the emitters 410a-i until a wireless signal 458 emitted from a wireless signal generator 456 is sent to the emitters 410a-i.

In one example, the emitters 410 can encode the data to be transmitted amongst each other and back to the target transceiver 463. The data can be encoded with the encoders 39, 139, 239, and 339. The encoders 39, 139, 239, 339 allow for more sophisticated messages to be transmitted. More specifically, the encoder of emitter 410a can send an encoded wireless message with information specific to emitter 410a. For example, the encoded wireless message could contain the identification number of emitter 410a and a message, such as a request to water its plant. Other emitters (e.g., 410c, 410e, and 410i) along the route that are in communication with emitter 410a can decode the message with decoders, such as decoders 40, 140, 240, and 340. They may also relay the encoded message to a decoder 468 associated with the controller 454.

Upon decoding the message with the decoder 468, the controller 454 can emit the wireless pulse 458 from the wireless signal generator 456. The wireless signal 458 may be a global wireless signal pulse that activates all emitters 410a-i. Alternatively, an encoder 466 associated with the controller 454 can create an encoded wireless signal pulse. For example, the encoded message could be configured to target an individual emitter, such as emitter 410a that has transmitted its identification number and watering request over the wireless drip emitter mesh network 400. The encoded wireless signal 458 broadcasts the identification number and watering command to wake up only emitter 410a and provides instructions to water its plant. The emitter 410a can decode the message with its decoder 140 and irrigate the plant. The encoded message also can be sent to a specific emitter to water regardless of whether the associated plant needs water. Thus, the encoded message can override the emitter. This can be advantageous when the electronics of an emitter our damaged.

Figure 12:
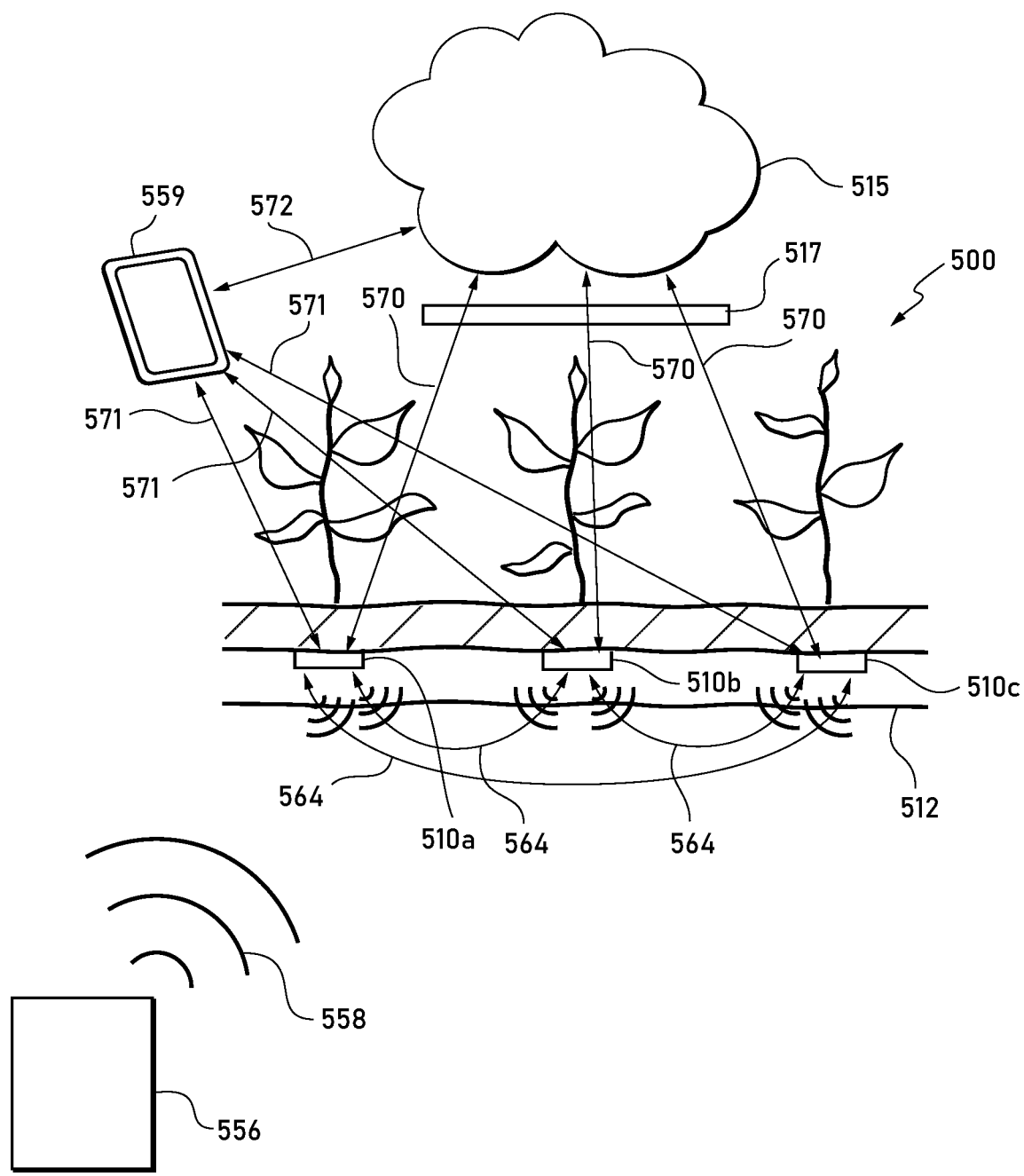
FIG. 12 is a schematic diagram of an alternative irrigation system with a wireless drip emitter mesh network.

FIG. 12 is an irrigation system illustrating how data may be transmitted from emitter-to-emitter and through a communications network. More specifically, the irrigation system is configured with a wireless drip emitter mesh network 500 that provides wireless communication, such as using WiFi, between emitters 510 (510a,b,c) and a communications network 515. Additional micro-electronics, such as those described herein, may be incorporated into the circuitry of the emitters 510a,b,c to allow the emitters to be more intelligent and provide additional computational capabilities. Furthermore, the emitters 510a,b,c can communicate in a decentralized, self-organized manner, thus not requiring a central controller; a concept often referred to as "swarm" or "hive" intelligence.

In the preferred embodiment, a wireless signal 558 emitted from a wireless signal generator 556 is sent to the emitters 510a,b,c. The emitters power on and collect data with their sensors. Features of the controller 454 of FIG. 11 (i.e., the data logger 460, the processor 462, the target transceiver 463, the encoder 466, and the decoder 468) may be integrated into individual emitters. Therefore, the emitters 510*a,b,c* have the computing power to analyze and log data. The emitters 510*a,b,c* can transmit data to each other with a wireless WiFi signal 564. Additionally, the emitters 510*a,b,c* can transmit data to a communications network 515 with a WiFi signal 570.

WiFi communications from the emitters provide close-range communication.

To access longer range communications, the emitters can communicate with a gateway 517 to the communications network 515, such as internet and/or cellular networks. As such, the data from the emitters 510*a,b,c* can be communicated to a mobile device 559 or other remote computing device. Therefore, a user can access information on any device with an internet or cellular connection, eliminating the need of an onsite controller. Furthermore, computing capabilities of a communications network, such as the cloud, mitigate the need for large memory requirements and processing capabilities onboard the emitters, because data may be stored with remote data devices and processing devices on the cloud. The processing may be used to analyze the data from the emitters 510*a,b,c*. This analysis can be used, for example, to understand plant condition and future watering needs.

In addition, the emitters 510*a,b,c* can be capable of communicating wirelessly to a mobile device that is in range of its communication protocol. For example, a mobile phone (such as mobile device 559) onsite with the emitters can form peer-to-peer communication connections 571 with one another. The peer-to-peer connections can be done using, for example, WiFi, Bluetooth®, Zigbee®, Z-Wave®, or Insteon®.

In one example, emitters 510*a,b,c* send WiFi signals 570 containing data collected by their sensors about the health and micro-climate of their respective plants. The signals 570 are routed through the gateway 517 and to the communications network 515, which in this case is the cloud. The data is stored and analyzed in the cloud 515. Analysis of the data may determine that the plant associated with emitter 510*a* has a disease. Therefore, a wireless WiFi signal 572 is sent from the cloud 515 to the mobile device 559 to alert a user that the plant associated with emitter 510*a* needs to be removed to prevent spread of the disease.

In another example, the data may also indicate to a user that the plants associated with emitters 510*a,b* are well irrigated, but the plant associated with emitter 510*c* requires watering. The user may send a message with the wireless WiFi signal 572 from the mobile device 559 to the network 515 with instructions for only emitter 510*c* to open its valve and water its plant. The network 515 routes the instructions via the WiFi signal 570 through the gateway 517 and to the emitter 510*c*. When the next irrigation cycle occurs, the signal generator 556 will emit the wireless signal pulse 558 to briefly power up the emitters 510*a,b,c*. Based upon the instructions embedded in the WiFi signals 570, emitters 510*a,b* remain closed and emitter 510*c* opens and emits water.

The matter set forth in the foregoing description and accompanying drawings is offered by way of illustration only and not as a limitation. While particular embodiments have been shown and described, it will be apparent to those skilled in the art that changes, and modifications may be made without departing from the broader aspects of the technological contribution. The actual scope of the protection sought is intended to be defined in the following claims.

What is claimed is:

1. An irrigation system comprising:
   a plurality of drip emitters;
   each of the plurality of drip emitters including:
      a wireless transceiver and
      a wirelessly-activated power source capable of being activated and powered by a wireless signal; and
   a wireless mesh communication network being formed by the plurality of transceivers.

2. The irrigation system of claim 1 further comprising at least one controller and the mesh network capable of being in wireless communication with the at least one controller.

3. The irrigation system of claim 1 further comprising a wireless signal device for issuing a wireless signal to activate and power the wirelessly-activated power source of at least one of the plurality of drip emitters.

4. The irrigation system of claim 1 wherein at least one of the plurality of drip emitters includes a sensor to collect data.

5. The irrigation system of claim 4 wherein the at least one sensor communicates wirelessly.

6. The irrigation system of claim 4 wherein the at least one sensor is configured to collect data relevant to the environment.

7. The irrigation system of claim 4 wherein the at least one sensor is configured to collect data relevant to a micro-climate of a plant.

8. The irrigation system of claim 4 wherein the at least one sensor includes at least one of a light detecting sensor, a temperature detecting sensor, a ground pressure detecting sensor, a moisture detecting sensor, a gas detecting sensor, or a humidity detecting sensor.

9. The irrigation system of claim 1 wherein the wireless mesh communication network routes communications between two or more of the plurality of transceivers.

10. The irrigation system of claim 9 wherein the communications between two or more of the plurality of transceivers are wireless communication signals.

11. The irrigation system of claim 1 further comprising a target transceiver and the wireless mesh communication network routes communications using one or more of the plurality of transceivers to the target transceiver.

12. The irrigation system of claim 11 further comprising a computing device and wherein the target transceiver is associated with the computing device.

13. The irrigation system of claim 1 further comprising a communications network to store and analyze data received from at least one of the plurality of drip emitters.

14. The irrigation system of claim 13 further comprising a wireless mobile device in communication with the communications network.

15. The irrigation system of claim 1 further comprising a wireless mobile device capable of wirelessly communicating in a peer-to-peer manner with at least one of the plurality of drip emitters.

* * * * *